United States Patent
Choi et al.

(10) Patent No.: US 10,652,753 B2
(45) Date of Patent: May 12, 2020

(54) METHOD FOR TRANSMITTING CONTROL SIGNAL AND CHANNEL IN MOBILE COMMUNICATION SYSTEM USING UNLICENSED BAND

(71) Applicant: Samsung Electronics Co., Ltd., Suwon-si, Gyeonggi-do (KR)

(72) Inventors: Seunghoon Choi, Seongnam-si (KR); Jinyoung Oh, Seoul (KR); Donghan Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/744,543

(22) PCT Filed: Jul. 25, 2016

(86) PCT No.: PCT/KR2016/008101
§ 371 (c)(1),
(2) Date: Jan. 12, 2018

(87) PCT Pub. No.: WO2017/018762
PCT Pub. Date: Feb. 2, 2017

(65) Prior Publication Data
US 2018/0206129 A1 Jul. 19, 2018

Related U.S. Application Data

(60) Provisional application No. 62/196,585, filed on Jul. 24, 2015.

(51) Int. Cl.
*H04W 16/14* (2009.01)
*H04L 5/00* (2006.01)
(Continued)

(52) U.S. Cl.
CPC ............ *H04W 16/14* (2013.01); *H04L 1/00* (2013.01); *H04L 5/0035* (2013.01);
(Continued)

(58) Field of Classification Search
CPC . H04W 16/14; H04L 1/00; H04L 5/00; H04L 5/0048
See application file for complete search history.

(56) References Cited

U.S. PATENT DOCUMENTS

2011/0305179 A1* 12/2011 Wang .................... H04L 1/0031
370/311
2012/0307744 A1* 12/2012 Charbit ............. H04W 72/1205
370/329
(Continued)

OTHER PUBLICATIONS

Huawei, Frame structure for LAA DL and UL transmission operation, R1-152470, 3GPP TSG RAN1 Meeting #81, May 16, 2015, Fukuoka, Japan.
(Continued)

*Primary Examiner* — Jael M Ulysse
(74) *Attorney, Agent, or Firm* — Jefferson IP Law, LLP

(57) ABSTRACT

An operation method of a base station in a mobile communication system operating in an unlicensed band is provided. The method includes communicating data with a terminal in a first cell, confining signal transmission occasion to a starting symbol of at least one slot of a subframe of a second cell, occupying resources by sensing a band corresponding to the second cell, and communicating with the terminal on the occupied resources based on the signal transmission occasion.

14 Claims, 12 Drawing Sheets

(51) Int. Cl.
  *H04L 1/00*    (2006.01)
  *H04L 27/26*   (2006.01)
  *H04W 74/08*   (2009.01)
  *H04W 72/04*   (2009.01)

(52) U.S. Cl.
  CPC .......... *H04L 5/0048* (2013.01); *H04L 5/0082* (2013.01); *H04L 5/0091* (2013.01); *H04L 27/2602* (2013.01); *H04W 72/042* (2013.01); *H04W 72/0446* (2013.01); *H04W 74/0808* (2013.01); *H04L 5/001* (2013.01); *H04L 5/0023* (2013.01)

(56) References Cited

U.S. PATENT DOCUMENTS

| | | | | |
|---|---|---|---|---|
| 2013/0044664 A1* | 2/2013 | Nory | ............... | H04L 1/0045 370/311 |
| 2013/0223258 A1* | 8/2013 | Seo | ............... | H04W 24/02 370/252 |
| 2013/0230013 A1* | 9/2013 | Seo | ............... | H04L 27/2602 370/329 |
| 2013/0315152 A1* | 11/2013 | Ratasuk | ............... | H04W 76/14 370/329 |
| 2013/0336177 A1* | 12/2013 | Gao | ............... | H04W 72/0446 370/280 |
| 2014/0003392 A1* | 1/2014 | Yang | ............... | H04L 5/001 370/331 |
| 2014/0029561 A1* | 1/2014 | Kim | ............... | H04W 72/042 370/329 |
| 2014/0050191 A1* | 2/2014 | Kim | ............... | H04L 5/001 370/329 |
| 2014/0071931 A1* | 3/2014 | Lee | ............... | H04L 5/001 370/329 |
| 2014/0092921 A1* | 4/2014 | Seo | ............... | H04L 5/0053 370/474 |
| 2014/0112289 A1* | 4/2014 | Kim | ............... | H04W 16/14 370/329 |
| 2014/0161056 A1* | 6/2014 | Moulsley | ............... | H04W 72/042 370/329 |
| 2014/0185539 A1* | 7/2014 | Seo | ............... | H04B 7/2656 370/329 |
| 2014/0341018 A1* | 11/2014 | Bhushan | ............... | H04W 72/04 370/230 |
| 2015/0003287 A1* | 1/2015 | Kalhan | ............... | H04W 24/08 370/254 |
| 2015/0099525 A1* | 4/2015 | Ji | ............... | H04W 72/04 455/450 |
| 2015/0201429 A1* | 7/2015 | Chen | ............... | H04W 72/1226 370/329 |
| 2015/0245232 A1* | 8/2015 | Luo | ............... | H04L 27/0006 370/252 |
| 2015/0358827 A1* | 12/2015 | Bendlin | ............... | H04W 72/0413 455/454 |
| 2015/0365214 A1* | 12/2015 | Ahn | ............... | H04W 52/146 370/329 |
| 2016/0095048 A1* | 3/2016 | Nory | ............... | H04W 24/08 370/252 |

OTHER PUBLICATIONS

Huawei, Discontinuous transmission and partial subframe design for LAA, R1-152471, 3GPP TSG RAN1 Meeting #81, May 16, 2015, Fukuoka, Japan.

Samsung, Discussion on (E)PDCCH/PDSCH transmission in partial subframe for LAA, R1-152871, 3GPP TSG RAN1 Meeting #81, May 16, 2015, Fukuoka, Japan.

* cited by examiner

METHOD FOR TRANSMITTING CONTROL SIGNAL AND CHANNEL IN MOBILE COMMUNICATION SYSTEM USING UNLICENSED BAND

TECHNICAL FIELD

The present invention relates to a control signal and channel transmission method in a mobile communication system operating in an unlicensed band and, in particular, to a method for transmitting a control signal and channel in a partial subframe.

BACKGROUND ART

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM){FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M) communication, and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M communication, and MTC technologies are implemented by means of 5G communication technologies such as beamforming, MIMO, and array antenna. The application of the aforementioned cloud RAN as a big data processing technology is an example of convergence between the 5G and IoT technologies.

As described above, discussions are underway about the development of communication techniques in various fields to meet the increasing demand for wireless data traffic. Examples of the communication techniques include an M2M communication system, frequency aggregation system for operating multiple cells, and multi-antenna system employing a massive antenna array.

DISCLOSURE

Technical Problem

The present invention proposes a method for transmitting a control signal or channel using a partial subframe in an unlicensed frequency band.

Technical Solution

In accordance with an aspect of the present invention, at least one of a control signal or channel and a data channel is transmitted in a partial subframe in a case where a channel occupancy operation is performed in an unlicensed band.

In accordance with another aspect of the present invention, an operation method of a base station in a mobile communication system operating in an unlicensed band includes communicating data with a terminal in a first cell, confining a signal transmission occasion to a starting symbol of at least one slot of a subframe of a second cell, occupying resources by sensing a band corresponding to the second cell; and communicating with the terminal on the occupied resources based on the signal transmission occasion.

In accordance with another aspect of the present invention, a base station of a mobile communication system operating in an unlicensed band includes a transceiver which transmits and receives signals and a controller which controls the transceiver to communicate data with a terminal in a first cell, confines a signal transmission occasion to a starting symbol of at least one slot of a subframe of a second cell, occupies resources by sensing a band corresponding to the second cell, and communicates with the terminal on the occupied resources based on the signal transmission occasion.

Advantageous Effects

The present invention is advantageous in terms of facilitating a channel occupancy operation in an unlicensed band and improving unlicensed band utilization efficiency by transmitting at least one of a control signal or channel and a data channel using a partial subframe.

MODE FOR INVENTION

Figure 1A:
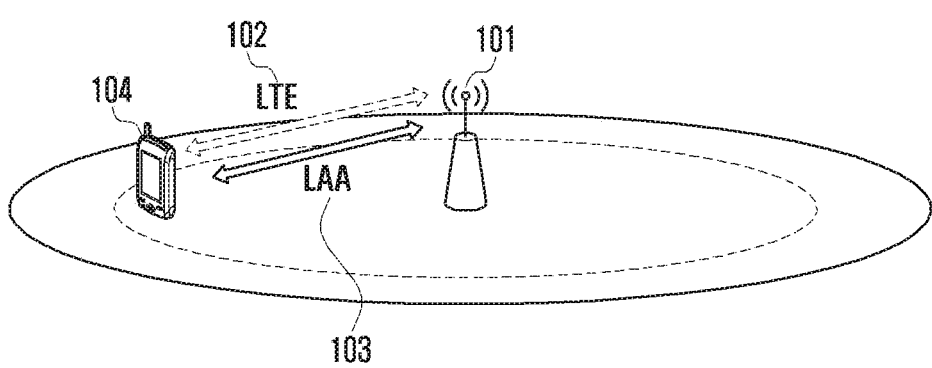
FIGS. 1A and 1B are diagrams illustrating communication systems to which the present invention is applied.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the description is mainly directed to LTE and LTE-Advanced (LTE-A), the present invention can be applied to other communication systems operating in both the licensed and unlicensed bands. Although the description is made under the assumption that the cell operating in an unlicensed band is configured as a secondary cell (SCell), the cell operating in the unlicensed band may be configured as a primary cell (PCell) or a primary secondary cell (PSCell). In the following description, a base station or cell operating in an unlicensed band for communication is interchangeably referred to as LAA SCell, LAA cell, LAA base station, and base station with the same meaning, and a terminal operating in the unlicensed band for communication is interchangeably referred to as LAA terminal, LAA user equipment, LAA UE, UE, and terminal with the same meaning.

In the following description, an LTE subframe comprised of a plurality of OFDM symbols of which a part is used for transmitting a control signal or channel or a data channel is referred to as a partial subframe. For example, if OFDM symbols 0 to k1 (k1<13) of 14 OFDM symbols (OFDM symbols 0, 1, 2, . . . , 13) constituting a subframe spanning 1 ms are used for transmitting a control signal or channel or a data channel, or if OFDM symbols k to 13 (k1>0) are used for transmitting a control signal or channel or a data channel, the corresponding subframe is referred to as a partial subframe.

Although the description is directed to a carrier aggregation (CA) environment for convenience of explanation, the present invention is not limited thereto and may be applicable to a dual-connectivity or standalone unlicensed band operation environment. Although the present invention is directed to a case where an LAA cell transmits a downlink control signal or channel or downlink data to an LAA terminal in an unlicensed band, the present invention is applicable to a case where an LAA terminal transmits an uplink control signal or channel or uplink data to an LAA cell in an unlicensed band.

The mobile communication system has evolved to a high-speed, high-quality wireless packet data communication system capable of providing data and multimedia services beyond the early voice-oriented services. In order to meet the requirements for the high-speed high quality wireless packet data transmission services, many mobile communication standards such as high-speed downlink packet access (HSDPA), high speed uplink packet access (HSUPA), LTE, and LTE-A of the $3^{rd}$ generation partnership project (3GPP), high rate packet data (HRPD) of 3GPP2, and 801.16 of the Institute of Electrical and Electronics Engineers (IEEE) have been developed.

In particular, LTE/LTE-A (hereinafter, collectively referred to as LTE) standards are still growing and evolving for improvement in system throughput and frequency utilization efficiency. For example, LTE has adopted carrier aggregation (CA), which is capable of using multiple frequency bands to increase dramatically data rate and system throughput.

Typically, an LTE system is operating in a frequency band licensed to a certain operator (licensed spectrum or licensed carrier). However, because the frequency resources for mobile communication services (e.g., frequency band below 5 GHz) are limited, it is difficult for one operator to secure broad frequency bands and to adopt CA for system throughput improvement.

Thus, much research has focused on LTE over unlicensed band (unlicensed spectrum or unlicensed carrier) to handle the explosive increase in mobile data in a situation difficult to secure licensed band frequency resources (e.g., LTE in unlicensed (LTE-U) and licensed-assisted access (LAA)). In particular, a 5 GHz unlicensed band is still less occupied by communication devices in comparison with a 2.4 GHz unlicensed band, and it is relatively easy to secure extra frequency bands. This makes it possible to consider performing LTE CA across licensed and unlicensed frequency bands. That is, it may be possible to implement the legacy LTE CA technique across licensed and unlicensed bands by configuring an LTE cell operating in the licensed band as a PCell (or Pcell) and an LTE cell (or LTE-U cell) operating in the unlicensed band as an SCell (or Scell).

Although implementation of CA in an environment where licensed and unlicensed bands are connected through an ideal backhaul and in a dual connectivity environment where licensed and unlicensed bands are connected through a non-ideal backhaul can be considered, the following description is made under the assumption of an environment where licensed and unlicensed bands are connected through an ideal backhaul.

Figure 1B:
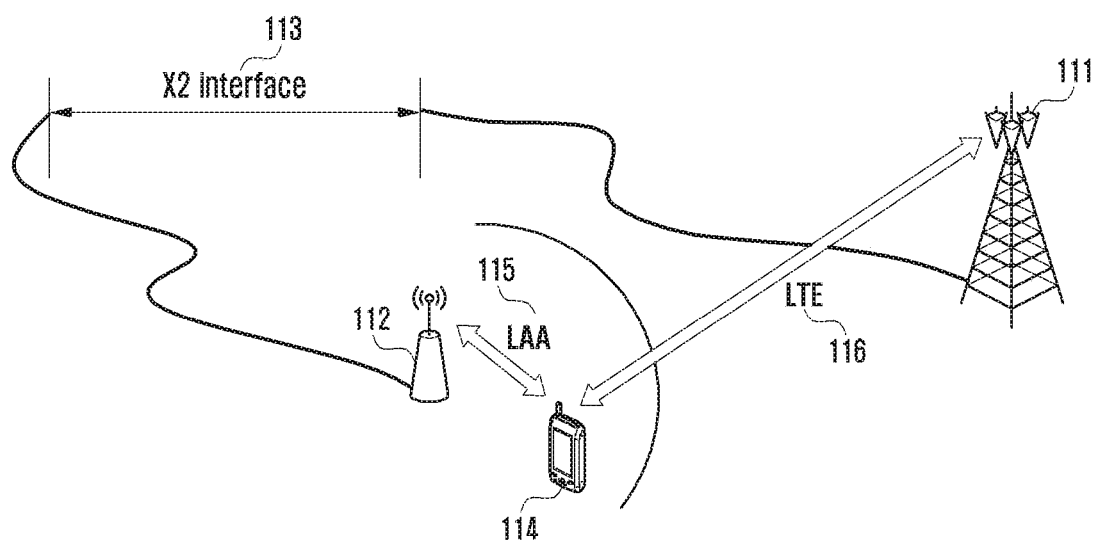

FIGS. 1A and 1B are diagrams illustrating communication systems to which the present invention is applied.

FIG. 1A depicts an exemplary system where a base station 101 operates an LTE cell 102 and an LAA cell 103 through which a terminal 104 communicates data with the base station 101. The LTE cell 102 and the LAA cell 103 are not limited to any duplex mode, and it is assumed that a cell operating in a licensed band for data communication is an LTE cell 102 or PCell and a cell operating in an unlicensed band for data communication is an LAA cell 103 or SCell. However, if the LTE cell is a PCell, it may be allowed that the uplink transmission may be allowed to be made to the PCell 102.

FIG. 1B depicts an exemplary system where an LAA small base station 112 is installed in a coverage area of an LTE macro base station 111 for increasing a data rate and, in this case, the LTE and LAA base stations 111 and 112 are not limited to any duplex mode. The LTE macro base station 111 may be replaced by an LTE small base station 112. If the LTE base station corresponds to the PCell, it may be allowed that uplink transmission is made to the LTE base station 111. Here, it is assumed that the LTE base station 111 and the LAA base station 112 are connected via a backhaul link. In this case, it is possible to guarantee fast communication between the base stations via X2 interface 113; thus, the LAA base station 112 can receive control information from the LTE base station 111 in real time even when uplink transmission is allowed only to the LTE base station 111. The methods proposed in the present invention can be applied to both the systems of FIGS. 1A and 1B.

Figure 2:
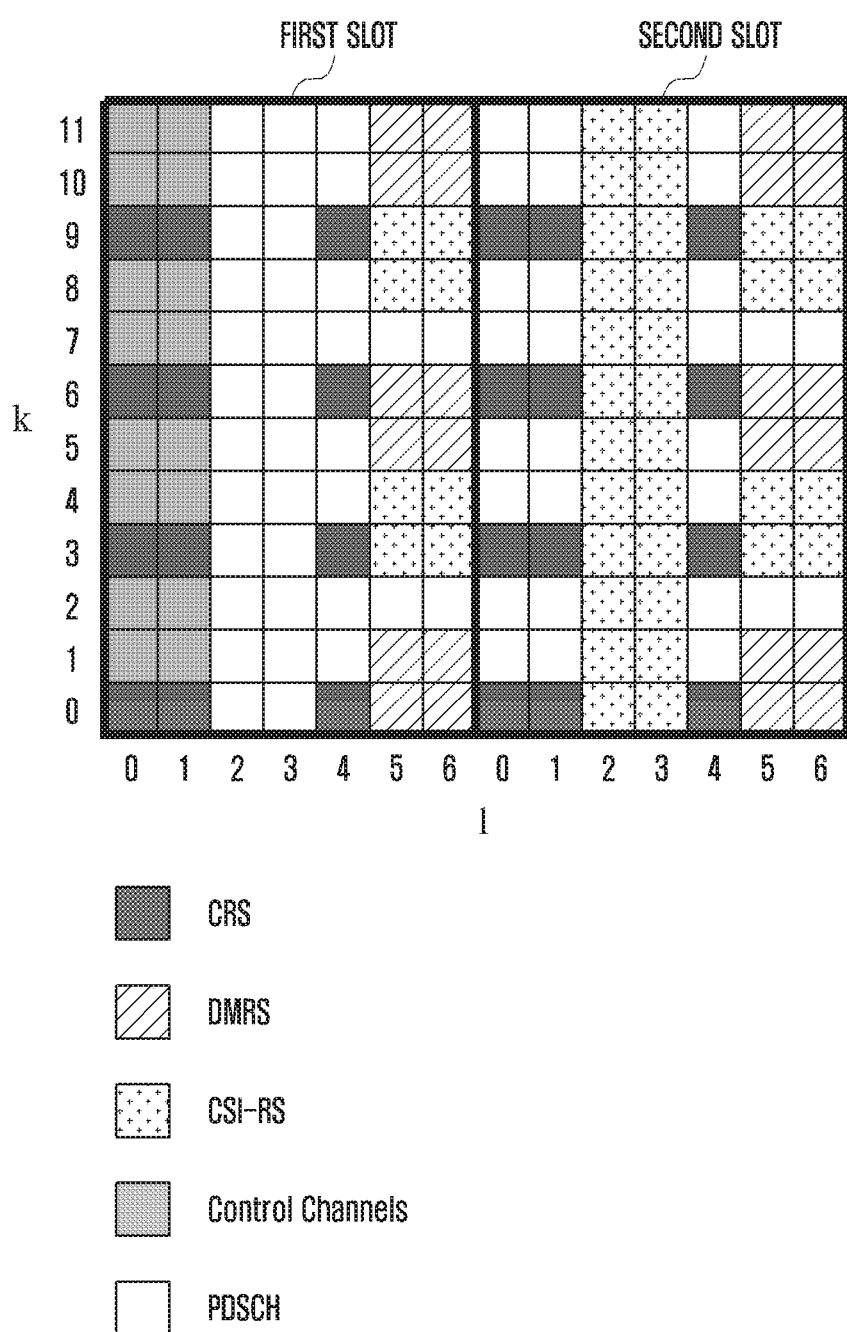
FIG. 2 is a diagram illustrating a radio resource configuration of an LTE system.

Typically, an LTE/LTE-A system adopts an orthogonal frequency division multiple access (OFDM) transmission scheme for data transmission. In the OFDM scheme, a modulation signal is mapped to a position in a 2-dimensinoal time-frequency resource grid. The resources on the time axis are divided into OFDM symbols that are orthogonal with each other. The resources on the frequency axis are divided into subcarriers that are orthogonal with each other. That is, it may be possible to indicate a smallest unit of resource by designating an OFDM symbol on the time axis and a subframe on the frequency axis, the smallest unit of resource being referred to as resource element (RE). Since different REs are orthogonal, although the signals mapped to different REs experience frequency selective channels, it may be possible for a receiver to receive the signals without mutual interferences. In the OFDM communication system, the downlink bandwidth is comprised of a plurality of resource blocks (RBs), and each physical resource block (PRB) consists of 12 subcarriers arranged on the time axis and 6 or 7 OFDM symbols on the time axis as shown in FIG. 2. On the time axis, a subframe consists of 2 slots, i.e., first slot and second slot, each spanning 0.5 msec, as shown in FIG. 2. It may be possible to configure radio resources as shown in FIG. 2 for transmitting different types of signals as follows:

1. Cell-specific Reference Signal (CRS): This is a reference signal broadcast periodically for use commonly by all UEs within one cell.

2. Demodulation Reference Signal (DMRS): This is a reference signal transmitted for a specific UE and used only for transmitting data to a corresponding UE. It may be possible to support up to 8 DMRS ports. In LTE/LTE-A, antenna ports 7 to 14 are allocated for DMRS and these ports maintain orthogonality with Code Division Multiplexing (CDM) or Frequency Division Multiplexing (FDM) to avoid interference with each other.

3. Physical Downlink Shared Channel (PDSCH): This is a downlink channel for use in transmitting traffic (or data) from an eNB to a UE using the REs to which no reference signal is mapped in the data region of FIG. 2.

4. Channel Status Information Reference Signal (CSI-RS): This is a reference signal transmitted for use by UEs within a cell in channel status measurement. It may be possible that multiple CSI-RSs are transmitted within a cell. In an LTE-A system, a CSI-RS may correspond to one, two, four, or eight antenna ports.

5. Other control channels (Physical Hybrid-ARQ Indicator Channel (PHICH), Physical Control Format Indicator Channel (PCFICH), and Physical Downlink Control Channel (PDCCH)): An eNB may provide a UE with control information for use in receiving data on PDSCH or transmit HARQ ACK/NACK corresponding to uplink data transmission.

The PDCCH region as a control channel region and enhanced PDCCH (ePDCCH) region as a data channel region may be divided on the time axis. This aims to receive and demodulate the control channel signal promptly. The PDCCH region is arranged across the entire downlink band, and one control channel is divided into small units of control channels dispersed in the entire downlink band. The uplink is divided into a control channel (PUCCH) and a data channel (PUSCH) and the acknowledgement channel and other feedback information corresponding to a downlink data channel are transmitted on the control channel for the case where there is no data channel and on the data channel for the case where there is the data channel.

Typically, an unlicensed frequency band or channel is shared by a plurality of devices. At this time, the devices using the unlicensed band may be different system devices. In order to share the unlicensed band, the different system devices have to operate as follows.

A transmitting device which wants to transmit a signal including data or control information checks whether the unlicensed band or channel is occupied by other devices before attempting to transmit the signal and may occupy the channel or not depending on the channel occupancy state. Such an operation is referred to as listen-before-talk (LBT). That is, the transmitting device has to check whether the corresponding channel is preoccupied according to a predetermined or preconfigured method. The channel sensing method may be predefined or preconfigured. The channel sensing time period may be predefined, preconfigured, or set to a value selected in a predetermined range. The channel sensing time period may be configured in proportion to a predetermined maximum channel occupancy time. At this time, the channel sensing operation for checking whether the channel can be occupied may be configured differently depending on the unlicensed band frequency, area, and country regulation. For example, in the USA, the 5 Ghz frequency band is allowed to be used without any channel sensing operation with the exception of the radar detection operation.

A transmitting device that wants to use the unlicensed band senses the corresponding channel through a channel sensing operation (or LBT) to determine whether the channel is occupied by other devices and, if the channel is not preoccupied by any device, it occupies the channel to use. At this time, the device using an unlicensed band may predefine or configure the maximum channel occupancy time after the channel sensing operation. At this time, the maximum occupancy time may be predefined according to the regulation stipulated per frequency band and area or configured by another device, e.g. the eNB. At this time, the channel occupancy time may be configured differently depending on the unlicensed band, area, or country regulation. For example, the maximum occupancy time for the 5 GHz band unlicensed spectrum is 4 ms in Japan. In Europe, however, the channel can be occupied continuously up to 10 ms or 13 ms. At this time, the devices occupying the maximum occupancy time may perform the channel sensing operation again to re-occupy the channel according to the channel sensing result.

Figure 3:
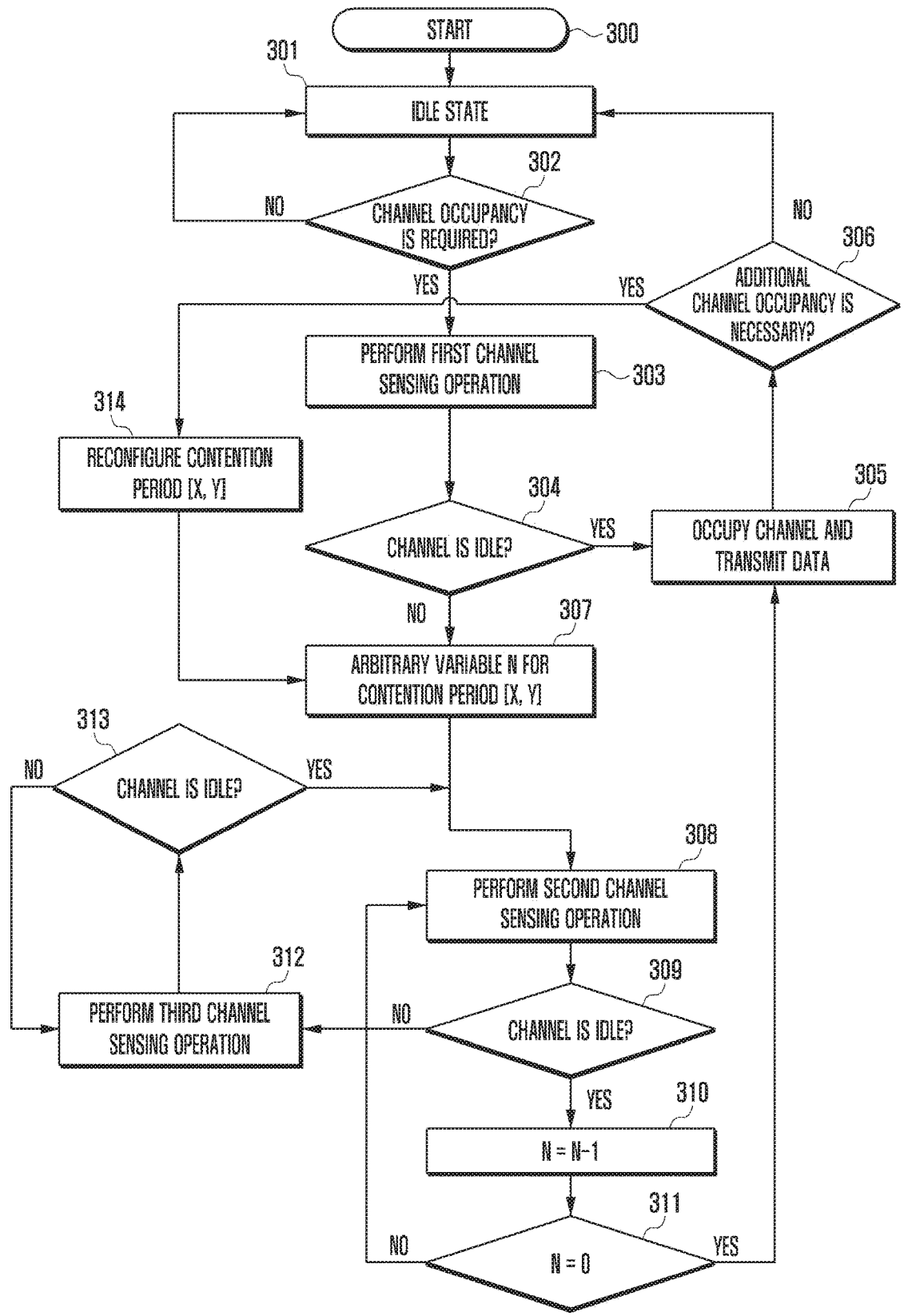
FIG. 3 is a flowchart illustrating an unlicensed band channel access method of an LAA system.

A description is made of the channel occupancy method for use of the unlicensed band in an LAA system hereinafter with reference to FIG. 3. An LAA cell (LAA SCell or LAA base station) with no data to transmit stays in an idle station at step 301. In the idle state, the LAA cell has no data to transmit in the unlicensed band. If it is necessary for the LAA cell in the idle state to occupy the channel for data or control signal transmission at step 302, the LAA cell may perform a first channel sensing operation at step 303. The first channel sensing operation may be configured differently depending on at least one condition of a predetermined time (e.g., 34 us), a time configured by another device, and type of data or control signal to be transmitted through the LAA cell. For example, the first channel sensing operation execution time for transmitting a control signal without data to a terminal through the LAA cell may be set to a value different from that of a first channel sensing operation execution time for transmitting data to the terminal through the LAA cell (i.e., first channel sensing operation execution time for control signal transmission<first channel sensing operation execution time for data transmission). The values available for the first channel sensing operation execution time may be predefined. As well as the first channel sensing operation execution time, at least one other parameter (e.g., received signal strength threshold for use in determination on whether to perform channel sensing) may be set to different values for the cases of transmitting the control signal without data and transmitting data to the terminal through the LAA cell. Here, the first channel sensing operation may be performed during a fixed period without configuration of any separate contention period, or the LAA cell may be configured to perform a second channel sensing operation with a channel sensing period set to an initial value. The first channel sensing operation may be performed to determine the channel occupancy status of other devices using one of various methods including at least one of received signal strength measurement or predetermined signal detection during a predetermined first channel sensing period. If it is determined at step 304 that the channel is in the idle state, the LAA cell may occupy the channel to transmit a signal at step 305. If it is determined at step 304 that the channel is occupied by other devices, the LAA cell may select a variable N to perform the channel sensing operation during a predetermined contention period [x, y] at step 307. Here, the initial contention period [x,y] may be predefined or configured by the base station. The contention period may be changed or reconfigured based on various parameters such as a number of channel occupancy attempts, a channel occupancy rate (e.g., traffic load), and a reception acknowledgement corresponding to the data transmitted through the occupied channel (e.g., ACK/NACK). For example, if it is necessary for the LAA cell that has occupied the channel at step 305 to maintain occupancy of the channel at step 306, the LAA cell may change or reconfigure the contention period at step 314 based on the result of data transmission performed at step 305 or the terminal's reception result of the data transmission performed previously. Although the description is directed to an exemplary case where the contention period is configured based on the result of data transmission made at step 305, it may also be possible to configure the contention period based on a previous channel occupancy and data transmission step or preconfigured value. For example, if the LAA cell performs data transmission to the terminal during the channel occupancy period and then receives a NACK corresponding to the data from the terminal, it may increase or maintain the contention period. If the LAA cell occupying the channel with the increased or maintained contention period transmits data to the terminal and then receives an ACK corresponding to the data from the terminal, it may decrease, maintain, or initialize the contention period. Although the description is directed to an exemplary case where the contention period is configured based on ACK/NACK, it may also be possible to configure the contention period based on other parameters aforementioned.

If an arbitrary variable N is configured for an initial contention period configured at step 307 or the contention period configured at step 314, it may be possible to perform a second channel sensing operation at step 308. Here, the second channel sensing operation is performed to determine a channel occupancy status based on at least one of received signal strength measured during a predetermined period and a predetermined signal in a way different from that of the first channel sensing operation. That is, the second channel sensing operation execution time may be equal to or shorter than the first channel sensing operation execution time. For example, the first channel sensing period may be set to 34 us while the second channel sensing period may be set to 9 us. Also, the second channel sensing operation threshold may be set to a value different from that of the first channel sensing operation threshold.

As a result of the channel sensing at step 308, if it is determined at step 309 that the channel is idle, the variable N configured at step 307 decrements by 1 at step 310. Although the description is directed to an exemplary case where the variable decrements by 1, it may be possible to decrease the variable differently depending on the configured value or type or characteristic of the signal to be transmitted by the LAA cell. If it is determined at step 311 that the variable N is set to 0, the LAA cell may occupy the channel to transmit the control signal or data signal at step 305. If it is determined at step 311 that the variable N is set to a non-zero value, the LAA cell may perform the second channel detection operation at step 308. As a result of the second channel sensing operation at step 308, if it is determined at step 309 that the channel is not idle, the LAA cell may perform a third channel sensing operation at step 312. The third channel sensing operation may be configured so as to be identical in configuration with at least one of the first and second channel sensing operations or different in configuration from both the first and second channel sensing operations. For example, the first and third channel sensing periods may be set to the same value of 34 us. Meanwhile, the first and third channel sensing operation thresholds may be set to different values. Although the description is made with specific channel sensing periods and channel sensing operation thresholds, it may be possible to set at least one of the variables and thresholds for the third channel sensing operation to a value identical with or different from that for the first channel sensing operation.

The third channel sensing operation may be configured to delay time without an extra channel sensing or channel occupancy operation. The LAA cell determines at step 313 whether a channel is occupied by other devices based on the threshold configured for the third channel sensing operation. If it is determined that the channel is idle, the LAA cell may perform the second channel sensing operation at step 308. If it is determined at step 313 that the channel is not idle, the LAA cell may perform the third channel sensing operation configured again at step 312. At least one of the first to third channel sensing operations may be skipped according to the type or characteristic of the data or control signal to be transmitted by the LAA cell. For example, if the LAA cell transmits only a control signal (e.g., discovery reference signal (DRS)), it may perform only the first channel sensing operation to occupy the channel for transmitting the DRS signal. Although the description is made with the DRS for which at least one of the first to third channel sensing operations is skipped, it may also be possible to skip at least one of the first to third channel sensing operation for transmitting other control signals.

The contention period applied for at least the second channel sensing operation may be changed or reconfigured at step 314. Here, the contention period may be configured based on at least one of a number of channel occupancy attempts, a channel occupancy rate (e.g., traffic load), and a base station's or terminal's reception acknowledgement corresponding to the data transmitted through the occupied channel (e.g., ACK/NACK). Although the description is directed to an exemplary contention period change or reconfiguration method, it may also be possible user other contention period change or reconfiguration methods.

The channel sensing and channel occupancy operations in the unlicensed band are described hereinafter in more detail with reference to FIG. 4. Although FIG. 4 exemplifies a downlink transmission procedure for transmitting data or a control signal from a transmitting node (e.g., LAA cell) to a receiving node (LAA terminal), it may also be possible for it to be applied to an uplink transmission procedure for transmitting a signal from an LAA terminal to an LAA cell.

Figure 4:
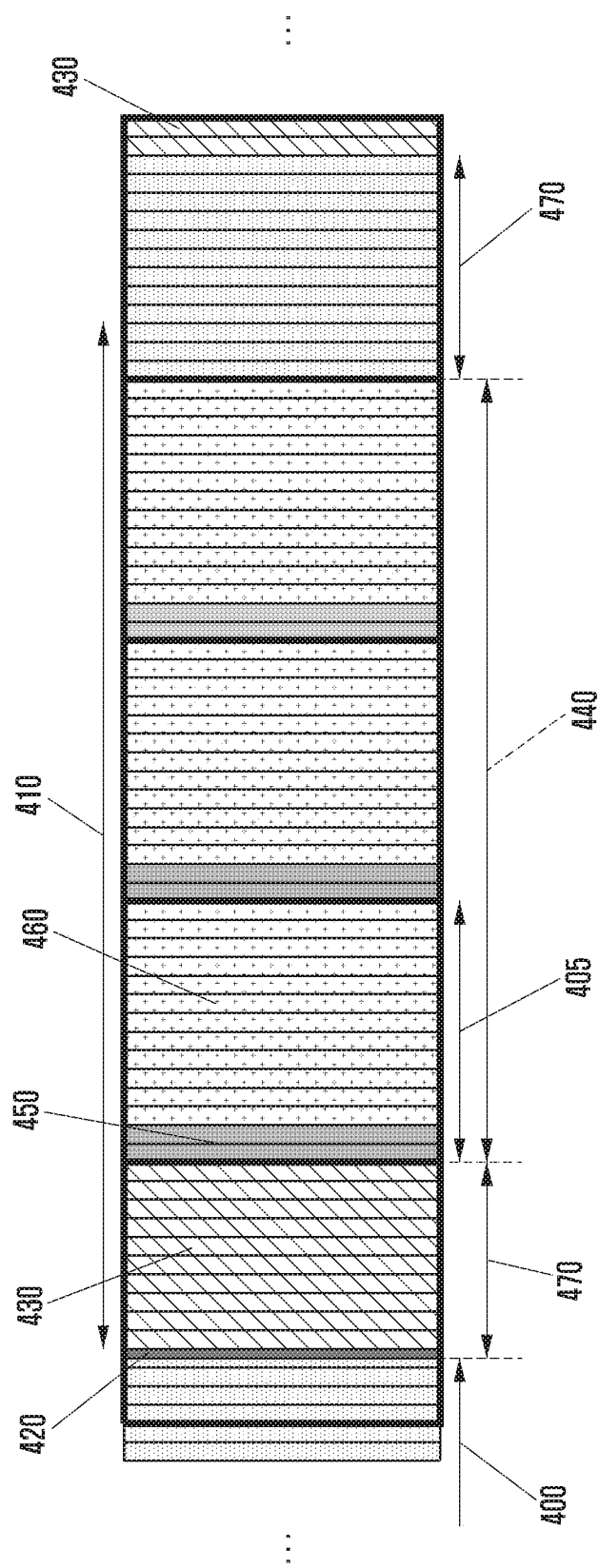
FIG. 4 is a diagram for explaining an unlicensed band channel access method of an LAA system.

In reference to FIG. 4, an LTE subframe 405 spans 1 ms and consists of a plurality of OFDM symbols (e.g., 14 OFDM symbols in the case of using a normal cyclic prefix (CP). In an unlicensed band communication between a transmitting node (LAA cell or base station) and a receiving node (LAA terminal or terminal), the transmitting node may perform a channel sensing operation as denoted by reference number 400 and, if it is determined as a result of the channel sensing operation that the unlicensed band is idle, occupy the channel during a predefined or preconfigured maximum channel occupancy period (or TXOP) 410 for communication. Here, the real channel occupancy period of the LAA cell may be shorter than the maximum channel occupancy period. If it is determined as a result of the channel sensing operation that the corresponding unlicensed band is occupied by other devices, the LAA cell may continue the channel sensing operation. If it is necessary for the LAA cell that has occupied the channel during the channel occupancy time 410 to maintain the occupancy of the channel, the LAA cell may perform the channel sensing operation again as denoted by reference number 470 and maintain the occupancy of the channel or not according to the result of the channel sensing operation. In this case, the required channel sensing period (or length) may be set to a value different from that for the previous channel sensing operation 400 according to the result of data transmission/reception through the unlicensed band. At least one of the variables for re-execution of the channel sensing operation may be set to a value different from that of the previous channel sensing operation.

The channel sensing and occupancy operation may be configured differently depending on the frequency band, area, or country regulation. A description is made of the channel sensing and occupancy operation hereinafter in detail with an example of Load-based equipment as one of the channel access schemes in the 5 GHz band regulation EN301 893 of Europe.

If the LAA cell wants to occupy the unlicensed band channel, it has to determine whether the channel is occupied by other devices during a minimum channel sensing period. Here, the minimum channel sensing period may be determined depending on the maximum channel occupancy period as follows:

Maximum channel occupancy period: $13/32 \times q$, $(q=4, \ldots, 32)$

Minimum channel sensing period: ECCA slot length x rand(1, q)

where the ECCA (enhanced clear channel assessment) slot length is a smallest channel sensing period unit (or length, e.g., 9 us) predefined or configured. That is, if q=32, the transmitting device may occupy the unlicensed band during up to 13 ms. At this time, the minimum required channel sensing period is selected randomly in the range of 1~q (i.e., 1~32), and the total channel sensing period becomes ECCA slot length x selected random value. Accordingly, if the maximum channel occupancy period increases, the minimum channel sensing period increases too. The maximum channel occupancy period and minimum channel sensing period are just examples and may be configured differently depending on the frequency band, area, and country regulation and changed according to a revision of the frequency regulation in the future. Also, additional operations (e.g., introduction of additional channel sensing period) may be included in addition to the channel sensing operation according to the frequency regulation. Here, the detailed configuration of the channel sensing operation may be changed by area, modifying the frequency band regulation, or changing the LAA cell configuration. If it is determined that the unlicensed band is not occupied by other devices during the channel sensing period 400, i.e., if the channel is in the idle state, the base station may occupy the channel immediately. At this time, whether the channel is occupied by other devices during the channel sensing period 400 may be determined based on a predefined or preconfigured reference value. For example, if the signal strength received from other devices during the channel sensing period is greater than a predetermined threshold value (e.g., −62 dBm), it may be determined that the channel is occupied by other devices. If the received signal strength is equal to or less than the threshold value, it may be determined that the channel is in the idle state. At this time, the channel occupancy determination may be made in such a way of detecting a predefined signal (e.g., initial signal) along with the received signal strength as described above.

In FIG. 4, the LAA cell may occupy the unlicensed band from an arbitrary OFDM symbol in a subframe according to the channel sensing operation end time of the LAA cell. However, the normal LTE operation is performed in a unit of subframe (e.g., signal transmission/reception starts from the first OFDM symbol of a subframe), and it may fail to transmit or receive a signal transmitted at an arbitrary OFDM symbol. Accordingly, the base station that has detected the idle channel during the channel sensing period 400 in the subframe may transmit at least one of specific signal 420 and 430 for channel occupancy from the time point when the channel sensing period 400 ends until right before transmission of the first OFDM symbol of the next subframe 405, i.e., the duration 470. That is, the base station may transmit the second signal 430 (e.g., PSS/SSS/CRS and newly defined signal) for the unlicensed band channel occupancy and UE synchronization before transmitting the first signal (e.g., at least one of legacy (E)PDCCH and PDSCH or modified (E)PDCCH and PDSCH, control signal (CRS, DMRS, and CSI-RS), or control channel (PCFICH and PHICH)) in the subframe 405. At this time, at least one of the second signals may not be transmitted depending on the channel sensing period end time. If the corresponding channel occupancy start time is set before a specific OFDM symbol, it is possible to transmit the second signal 430 after transmitting the third signal 420 (newly defined signal in the form of a preamble) and before the start of the next OFDM symbol. Although the channel sensing operation period is described using the unit of OFDM symbol for explanatory convenience in the present invention, the channel sensing operation period may be configured regardless of the OFDM symbol of the LTE system.

Here, the second signal may be generated by reusing the PSS/SSS used in the legacy LTE system or at least one of the PSS and SSS generated with a sequence different from the root sequence used in the licensed band. The second signal may also be generated with a sequence with the exception of the PSS/SSS sequence necessary for generating an unlicensed band base station identifier (PCID or Physical Cell ID) so as not to be confused with the unique value of the base station. The second signal may also include at least one of the CRS and CSI-RS used in the legacy LTE system or a (E)PDCCH or PDSCH or signal modified therefrom.

As described above, if the LAA cell starts occupying the channel through the channel sensing operation and transmits the second signal till the next subframe, the real channel occupancy period 440 for transmitting the data or control signal in the occupied unlicensed band is shorter than the maximum channel occupancy period 410. This means that it is difficult to use the unlicensed band efficiently in the legacy LTE system in which the signal transmission and reception operation starts at the first OFDM symbol or ends at the last OFDM symbol in a subframe. There is therefore a need of a method for making it possible to start signal transmission and reception operation at an arbitrary OFDM symbol and end signal transmission and reception operation at an another arbitrary OFDM symbol. If the signal transmission/reception operation starts at all arbitrary OFDM symbols, the terminal has to attempt the reception operation for all cases for receiving data or control signals/channel. This may increase complexity of the terminal as well as data or control signal/channel reception power consumption of the terminal. In order to overcome this problem, the present invention proposes a method for starting data or control signal/channel transmission operation from an LAA cell to an LAA terminal at a predefined or preconfigured OFDM symbol in a subframe and ending data or control signal/channel transmission operation from the LAA cell to the LAA terminal at a predetermined or preconfigured OFDM symbol in the subframe. By starting/ending the data or control signal/channel transmission and reception operation at a predetermined OFDM symbol, it is possible to minimize the complexity of a terminal and maximize frequency utilization efficiency.

Although only the CA environment is taken into account in the following description for convenience of explanation, the present invention can be applied in a dual-connectivity environment or a stand-alone unlicensed band environment.

As described with reference to FIG. 3, it may be possible to maintain the channel occupancy before transmission of a control signal/channel or data channel by transmitting the second signal (or initial signal) until the start time point of the next subframe (e.g., first OFDM symbol of next subframe) according to the channel sensing operation end time point of the LAA cell. If the LAA cell starts occupying the channel through the channel sensing operation and transmits the second signal before the arrival of the next frame as described with reference to FIG. 3, the real channel occupancy period 440 is shorter than the maximum channel occupancy period 410. There is therefore a need of a method for starting a signal transmission and reception operation at an arbitrary OFDM symbol and ending the signal transmission and reception operation at another arbitrary OFDM symbol. In this case, however, if the signal transmission/reception operation starts at an arbitrary OFDM symbol and ends at another arbitrary OFDM symbol, the terminal has to attempt the reception operation for all cases for receiving data or control signals/channel transmitted by the LAA cell in partial subframes because it does not know the channel sensing operation end time point of the LAA cell. This may increase complexity of the terminal as well as data or control signal/channel reception power consumption of the terminal.

In order to overcome this problem, the present invention proposes a method for starting data or control signal/channel transmission operation from an LAA cell to an LAA terminal at a predefined or preconfigured OFDM symbol in a subframe and ending data or control signal/channel transmission operation from the LAA cell to the LAA terminal at a predetermined or preconfigured OFDM symbol in the subframe. By starting/ending the data or control signal/channel transmission and reception operation at a predetermined OFDM symbol, it is possible to minimize the complexity of a terminal and maximize frequency utilization efficiency.

Embodiment 1

In embodiment 1, the transmission start time point of a first or second signal is confined to the start time points of the first and second slots for use of a partial subframe of an LAA cell. Although the description is made of the embodiment with the start time of the first signal (e.g., PDCCH), it may also be possible to designate the start time point of one of the first and second slots as the transmission start time of the first signal (e.g., PDSCH) or the second signal. That is, the potential transmission start time of the first signal is OFDM symbol index 0 of the first or second slot in this embodiment.

That is, the first signal transmission may start at the first OFDM symbol of the first or second slot. In the case that the first signal transmission occasion is confined to the start time points of the first and second slots, if the first signal transmission starts at the first slot, the corresponding subframe may be regarded as a non-partial subframe. In the case that the second signal transmission occasion is confined to the start time points of the first and second slots, if the second signal transmission starts at the first slot, the corresponding subframe may be regarded as a partial subframe. That is, the partial subframe is the case where the first signal transmission part is shorter than 1 ms.

Figure 5:
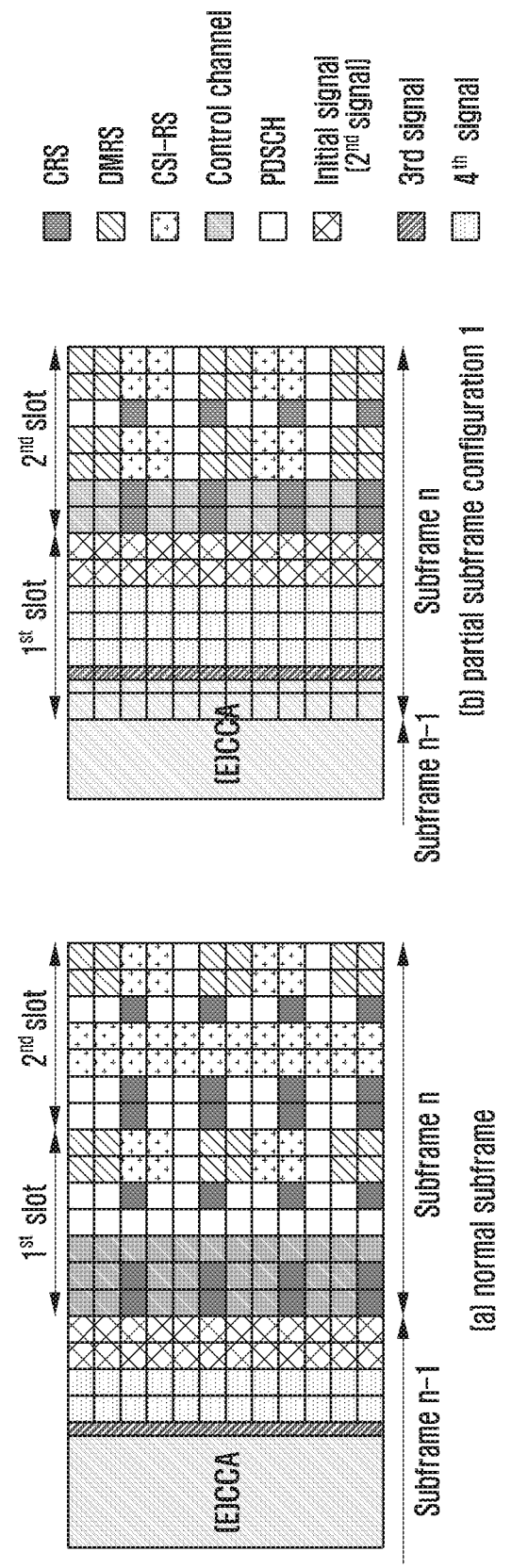
FIG. 5 is a diagram for explaining a slot-based partial subframe utilization method.

Embodiment 1 is described hereinafter with reference to FIG. 5. FIG. 5 is a diagram illustrating a normal subframe (part (a)) with the first signal starting at the first slot and a partial subframe (part (b)) with the first signal starting at the second slot in an unlicensed band that are configured as a result of ECCA of an LAA cell. Part (a) of FIG. 5 is depicted under the assumption that the LAA cell performs ECCA before subframe n to determine that the unlicensed band is idle at the second slot of subframe n−1.

In this case, if the end time point of the channel sensing operation is within an OFDM symbol duration of the LAA cell (e.g., channel sensing operation ends or the channel is determined idle within the third OFDM symbol duration of the second slot), the LAA cell transmits a third signal in a duration starting from the channel sensing operation end time point and ending right before the start time point of the next OFDM symbol (e.g., starting from the channel sensing operation end time point and ending right before the fourth symbol of the second slot) to occupy the unlicensed band. Here, the third signal is shorter in time than one OFDM symbol of the LAA cell and may be generated and transmitted by the LAA cell with no need of complying with any standard. In this case, the LAA terminal may not receive the third signal or, although receiving the third signal, may not use the received third signal.

In embodiment 1, since the transmission start time point of the first or second signal is confined to the start time points of the first and second slots in order to reduce the first or second signal decoding complexity of the LAA terminal, the LAA cell may transmit at least one of the second to fourth signals right before the second slot of subframe n−1 in which the channel sensing operation ends or right before the first slot of the next subframe n so as to maintain occupancy of the unlicensed band. Here, the fourth signal may be a reference signal (such as CRS, DMRS, and CSI-RS), a synchronization signal (such as PSS/SSS), and a channel (such as PDCCH and PDSCH). If it is necessary to transmit the second signal, which should be followed by initial transmission of the first signal in the LAA cell, to occupy the channel for data transmission, the second signal may be transmitted during a period predetermined for second signal transmission right before the first or second slot. In the case of part (a) of FIG. 5, the second signal may be transmitted during a predefined or preconfigured number of symbols including at least the ending symbol of subframe n−1 because the first signal transmission starts at the first slot of subframe n. In this embodiment, if it is predetermined to transmit the second signal during at least K OFDM symbols, the OFDM symbol index for transmitting the second signal becomes 7-K in the case of using the normal CP. This means that the second signal can be transmitted in the duration starting from OFDM symbol index 7-K of the first or second slot. In this embodiment, it is assumed that the second signal is transmitted in the period of 2 OFDM symbols, which should be followed by initial transmission of the first signal in the LAA cell, to occupy the channel for data transmission, for convenience of explanation. Accordingly, the OFDM symbol indexes 5 and 6 of the first and second slots can be used for transmitting the second signal. Here, the second signal may be transmitted repetitively in the period of two OFDM symbols, the second signals in the two respective OFDM symbols being identical with or different from each other. It may also be possible to skip transmitting the second signal or transmit the second signal in one OFDM symbol or 3 or more OFDM symbols. The second signal transmission occasions may be predefined or configured by the LAA cell using a higher layer signal. The second signal transmission occasions may be implicitly designated by confining the first signal transmission occasions to the start time points of the first and second slots under the assumption that the second signal is transmitted in the period of 2 OFDM symbols, which should be followed by initial transmission of the first signal in the LAA cell, to occupy the channel for data transmission. That is, the first signal transmission occasion becomes the $0^{th}$ OFDM symbol of the first or second slot of subframe n, and the second signal transmission occasion becomes the $6^{th}$ OFDM symbol of the second slot of subframe n−1 or the $6^{th}$ OFDM symbol of the first slot of subframe n. Accordingly, if it is determined that the unlicensed band is in the idle state before the second signal transmission occasion in the case of confining the first signal transmission occasion to the start time points of the first and second slots under the assumption that the second signal is transmitted in the period of 2 OFDM symbols, which should be followed by initial transmission of the first signal in the LAA cell, to occupy the channel for data transmission, the LAA cell may repeat transmission of the third signal, transmit a newly defined fourth signal, or repeat transmission of the second signal before the second signal transmission occasion to maintain occupancy of the unlicensed band. In the case of repeating transmission of the second signal, the LAA terminal may ignore the second signal or, although receiving the second signal, may not use the received second signal. That is, the second signal configured for use by the LAA terminal is transmitted in the period of 2 OFDM symbols followed by transmitting the first signal. As described in this embodiment, in the case of confining the first signal transmission occasion to the start time points of the first and second slots under the assumption that the second signal is transmitted in the period of 2 OFDM symbols, which should be followed by initial transmission of the first signal in the LAA cell, to occupy the channel for data transmission, the LAA cell may start transmitting an arbitrary signal or a signal agreed with the terminal from the time point when the unlicensed band is sensed as idle until before the next second signal transmission occasion to maintain occupancy of the unlicensed band and may start transmitting the first signal including a control signal (e.g., CRS, DMRS, and CSI-RS) or control channel (e.g., PCFICH, PHICH, PDCCH, and EPDCCH) and data (e.g., PDCCH) at the first signal transmission occasion to communicate with the LAA terminal in the unlicensed band. Meanwhile, the LAA terminal may receive and decode the second signal at the second signal transmission occasion predefined or configured through higher layer signaling and perform an operation that should be executed upon receipt of the second signal (e.g. AGC adjustment, time or frequency synchronization, or transmitting device ID check). Afterward, the LAA terminal may start receiving the first signal including the control signal (e.g., CRS, DMRS, and CSI-RS) or control channel (PCFICH, PHICH, PDCCH, and EPDCCH) and data channel (e.g., PDSCH) at the first signal transmission occasion to communicate with the LAA cell in the unlicensed band. If it is not necessary for the LAA terminal to perform the second signal reception and decoding operation, the LAA terminal may receive the first signal at the first signal transmission occasion predefined or configured through higher layer signaling to communicate with the LAA cell.

Part (b) of FIG. 5 is directed to a case where the start time point of the second slot is predefined or preconfigured as the first signal transmission occasion through high layer signaling. In detail, the LAA cell performs ECCA at the first slot of subframe n to determine whether the unlicensed band is in the idle state. In this embodiment, since the first signal transmission occasion is confined to the start timepoints of the first and second slots, the LAA cell may maintain the occupancy of the unlicensed band by transmitting at least one of the second to fourth signals before the second slot. As described with reference to part (a) of FIG. 5, if the second signal is transmitted in the period of 2 OFDM symbols, which should be followed by initial transmission of the first signal in the LAA cell, to occupy the channel for data transmission, the LAA cell may transmit at least one of the second to fourth signals until a second signal transmission occasion before the second time slot to maintain the occupancy of the unlicensed band and transmit the first signal including a control signal (e.g., CRS, DMRS, and CI-RS) or control channel (e.g., PCFICH, PHICH, PDCCH, and EPDCCH) and data channels (e.g., PDSCH) to the LAA terminal at the first and second transmission occasions.

Although the embodiment of part (a) of FIG. 5 can be implemented by reusing the DMRS signal and positions as specified in the legacy LTE standard, it is difficult to implement the embodiment of part (b) of FIG. 5 as such because such DMRS positions are not specified in the legacy LTE standard. Accordingly, it is necessary to define new DMRS positions for starting transmission of the second signal in the second slot for the case where the first signal transmission occasion for initial transmission of the first signal in the LAA cell which occupies the channel initially for data transmission is confined to the start time points of the first and second slots. In the case of starting transmission of the first signal at the first slot, it may be possible to reuse the DMRS configuration specified in the legacy LTE standard.

The new DMRS symbol position l for the case of transmitting DMRS at the $3^{rd}$, $4^{th}$, $6^{th}$, and $7^{th}$ OFDM symbols (OFDM symbol index l=2, 3, 5, 6) of the second slot as shown in part (b) of FIG. 5 may be designated as follows. At this time, the DMRS frequency position (k) for the case of transmitting DMRS at the $3^{rd}$, $4^{th}$, $6^{th}$, and $7^{th}$ OFDM symbols of the second slot may be configured as specified in the legacy LTE standard.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad [\text{Formula 1}]$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 + 3\lfloor l'/2 \rfloor & \text{if in a partial subframe with configuration 1} \\ l' \bmod 2 + 5 & \text{if not in a partial subframe} \end{cases}$$

$$l' = \begin{cases} 0, 1, 2, 3 & \text{if } n_s \bmod 2 = 1 \text{ and in a partial subframe with configuration 1} \\ 0, 1 & \text{if } n_s \bmod 2 = 0 \text{ and not in a partial subframe} \\ 2, 3 & \text{if } n_s \bmod 2 = 1 \text{ and not in a partial subframe} \end{cases}$$

$$m' = 0, 1, 2$$

The new DMRS symbol position l for the case of transmitting DMRS at the $3^{rd}$ and $4^{th}$ OFDM symbols (OFDM symbol index l=2, 3) of the second slot may be designated as follows. At this time, the DMRS frequency position (k) for the case of transmitting DMRS at the $3^{rd}$ and $4^{th}$ OFDM symbols of the second slot may be designated as specified in the legacy LTE standard.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad [\text{Formula 2}]$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 + 3\lfloor l'/2 \rfloor & \text{if in a partial subframe with configuration 1} \\ l' \bmod 2 + 5 & \text{if not in a partial subframe} \end{cases}$$

$$l' = \begin{cases} 0, 1 & \text{if } n_s \bmod 2 = 1 \text{ and in a partial subframe with configuration 1} \\ 0, 1 & \text{if } n_s \bmod 2 = 0 \text{ and not in a partial subframe} \\ 2, 3 & \text{if } n_s \bmod 2 = 1 \text{ and not in a partial subframe} \end{cases}$$

$$m' = 0, 1, 2$$

The new DMRS symbol position l for the case of transmitting DMRS at the $6^{th}$ and $7^{th}$ OFDM symbols (OFDM symbol index l=5, 6) of the second slot may be designated as follows. At this time, the DMRS frequency position (k) for the case of transmitting DMRS at the $6^{th}$ and $7^{th}$ OFDM symbols of the second slot may be designated as specified in the legacy LTE standard.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad [\text{Formula 3}]$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 + 3\lfloor l'/2 \rfloor & \text{if in a partial subframe with configuration 1} \\ l' \bmod 2 + 5 & \text{if not in a partial subframe} \end{cases}$$

$$l' = \begin{cases} 2, 3 & \text{if } n_s \bmod 2 = 1 \text{ and in a partial subframe with configuration 1} \\ 0, 1 & \text{if } n_s \bmod 2 = 0 \text{ and not in a partial subframe} \\ 2, 3 & \text{if } n_s \bmod 2 = 1 \text{ and not in a partial subframe} \end{cases}$$

$$m' = 0, 1, 2$$

It may be possible to configure such that the LAA cell does not transmit DMRS in the partial subframe as shown in part (b) of FIG. 5. If no DMRS is transmitted in the partial subframe, the LAA cell may not schedule the LAA terminal configured to perform a PDSCH reception operation based on DMRS as in TM10 or may configure the LAA terminal to perform a PDSCH reception operation based on CRS using DCI format 1A. In this case, the LAA terminal may detect the partial subframe upon receipt of the second signal without extra signaling from the LAA cell and assume the absence of DMRS in the corresponding subframe. It may also be possible for the LAA terminal to detect the partial subframe based on the receipt of CRS conveyed in the first signal and assume the absence of DMRS in the corresponding subframe. That is, the LAA terminal may regard the subframe conveying the second signal as a partial subframe and thus assume no DMRS transmission or perform a CRS-based PDSCH reception operation rather than the DMRS-based PDSCH reception operation. That is, if the second signal and DMRS are conveyed in the same subframe, it may be possible to determine that DMRS has not been transmitted. Even when the LAA cell configures the terminal to perform a DMRS-based PDSCH reception operation in the partial subframe, the terminal may handle PDSCH as NACK or perform a CRS-based PDSCH reception operation.

In the partial subframe as shown in part (b) of FIG. 5, it may be possible to preconfigure the LAA cell not to transmit CSI-RS. That is, in the case that the CSI-RS resources for the LAA cell are assigned periodically according to the time of the licensed band PCell or the unlicensed band LAA cell, if the subframe conveys only the CSI-RS or both the second signal and CSI-RS, the LAA terminal may determine the corresponding subframe as a partial subframe and thus assume absence of CSI-RS of the LAA cell or skip a CSI-RS-based reception and channel estimation operation in the partial subframe. In the case of configuring the LAA cell not to transmit CSI-RS, the LAA terminal may assume that the partial subframe is conveying no CSI-RS and may perform the PDSCH reception operation without extra rate matching on part or all of the NZP-CSI-RS or ZP-CSI-RS resources. The LAA cell may transmit CSI-RS on part of the CSI-RS resources even in a partial subframe depending on the configuration of the partial subframe (e.g., CRS and DMRS). For example, the CSI-RS resource region of the partial subframe as marked in part (b) of FIG. 5 can be used for transmitting CSI-RS. Accordingly, in the case that the CSI-RS resources for the LAA cell are assigned periodically according to the time of the licensed band PCell or the unlicensed band LAA cell, if the subframe conveys only the CSI-RS or both the second signal and CSI-RS, the LAA terminal may determine the corresponding subframe as a partial subframe and perform CSI-RS reception on the available CSI-RS resources for channel estimation and rate matching on CSI-RS resources to receive PDSCH depending on the configuration of the partial subframe (e.g., DMRS position).

In the case of transmitting the first signal in the LAA cell to occupy the channel initially for data transmission using a partial subframe, the subframe conveying the first signal transmitted last in the predefined or preconfigured unlicensed band channel occupancy time 670 may also be a partial subframe. A description thereof is made with reference to FIG. 6. It is assumed that the LAA cell that communicates with the LAA terminal in the unlicensed band performs a channel sensing operation as denoted by reference number 600 and determines that the unlicensed band is in the idle state. The LAA cell may transmit a third signal 610 according to the time point when it is determined that the channel is idle as the channel sensing result. In the case where the first signal transmission occasion is confined to the first OFDM symbols of the first and second slots under the assumption that the second signal 620 is transmitted in the period of 2 OFDM symbols followed by transmitting the first signal 650 and 660 in the LAA cell which occupies the channel initially for data transmission, the LAA cell may transmit a fourth signal 615 (e.g., at least one of the second and third signals, an arbitrary signal, and a signal pre-agreed with the terminal) to maintain occupancy of the unlicensed band, the fourth signal transmission being possible upon sensing the idle state of the unlicensed band before a second signal transmission occasion, and the first signal including a control signal (e.g., CRS, DMRS, and CSI-RS) or control channel (e.g., PCFICH, PHICH, PDCCH, and EPDCCH) and data (e.g., PDCCH) at the first signal transmission occasion to communicate with the LAA terminal in the unlicensed band. At this time, the LAA cell may occupy the unlicensed band during the predefined or preconfigured unlicensed band channel occupancy time 670 including the transmission time point of the third signal 610. Accordingly, at least one partial subframe 630 and 640 may exist during the unlicensed band channel occupancy time 670. In order to make the best use of the unlicensed band channel occupancy time 670, it may be necessary to use the partial subframes 630 and 640.

If the first signal transmission occasion is confined to the first OFDM symbols of the first and second slots under the assumption that the second signal is transmitted in the period of 2 OFDM symbols followed by initial transmission of the first signal in the LAA cell for data transmission as in this embodiment, the terminal may attempt receiving and decoding of the second signal or the CRS included in the first signal at the second signal position configured as above so as to determine whether the unlicensed band of the LAA cell is occupied. However, since the LAA cell may transmit the third and fourth signals 610 and 615 according to the channel sensing operation end time point of the LAA cell, a terminal without a capability of receiving and decoding the third and fourth signals 610 and 615 cannot determine correctly the real channel occupancy start time point of the LAA cell. In the case where the LAA terminal cannot determine correctly the real channel occupancy start time point, if the last subframe of the channel occupancy period 670 of the LAA cell is a partial subframe 640, the LAA terminal cannot predict the length of the partial subframe. For example, assuming that the channel occupancy period 670 of the LAA cell is 4 ms in FIG. 6, if the first subframe of the channel occupancy period 670 of the LAA cell is a partial subframe 630 and has a length of up to 4 OFDM symbols, the final subframe of the channel occupancy period 670 of the LAA cell is a partial subframe having up to 10 OFDM symbols. However, if the terminal without the capability of receiving and decoding the third and fourth signals 610 and 615 determines the length of the starting partial subframe of the channel occupancy duration 670 of the LAA cell based on the second signal reception and decoding time point as denoted by reference number 630, it cannot correctly determine the length of the ending partial subframe. This embodiment proposes a method for a terminal without the capability of receiving and decoding the third and fourth signals 610 and 615 as above to determine the length of the ending partial subframe of the channel occupancy period of the LAA cell.

Method 1: Determine the length (or number of OFDM symbols) of the ending partial subframe of the channel occupancy period of an LAA cell as 0

Method 2: Receive information on the length (or number of OFDM symbols) of the ending partial subframe of the channel occupancy period of an LAA cell through a downlink control channel of the LAA cell or PCell Method 3: Determine the length (or number of OFDM symbols) of the ending partial subframe of the channel occupancy period of an LAA cell based on the first signal transmission occasion of the LAA cell Method 4: Determine the length (or number of OFDM symbols) of the ending partial subframe based on type and position of the second signal In the first method, the LAA terminal determines that the length (or number of OFDM symbols) of the ending partial subframe of the channel occupancy period of the LAA cell as 0, i.e., it may be preconfigured not to use the ending partial subframe of the channel occupancy period of the LAA cell. That is, if the LAA cell that has occupied the unlicensed band determines that the last subframe of the channel occupancy period 670 is a partial subframe, it may not transmit the first signal in the partial subframe.

Figure 6:
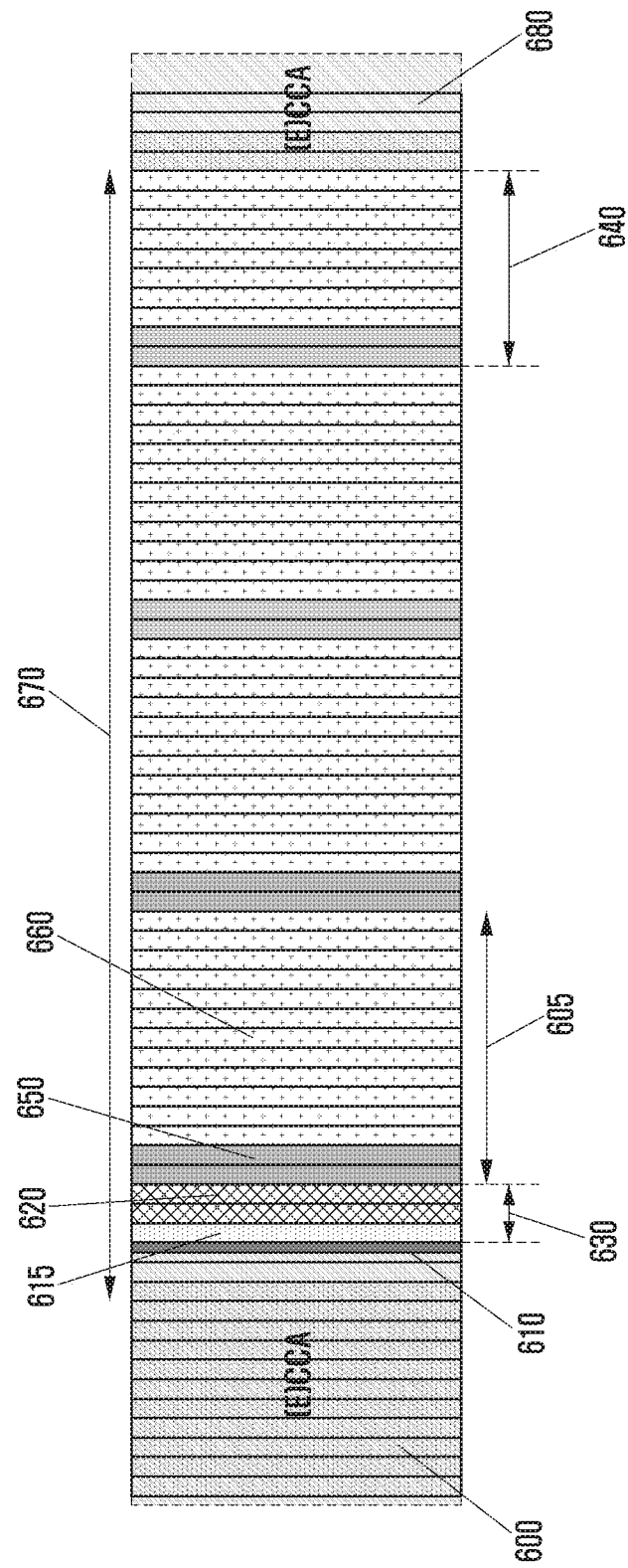
FIG. 6 is a diagram for explaining a method for using an ending partial subframe in a channel occupancy period.

In method 2, the LAA terminal receives the information on the length (or number of OFDM symbols) of the ending partial subframe of the channel occupancy period of the LAA cell through a downlink control channel of the LAA cell or PCell. Here, in order to reduce downlink control channel overhead, it may be possible to limit the length (or number of OFDM symbols) of the ending partial subframe of the channel occupancy period of the LAA cell. For example, it may be possible to notify the LAA terminal of the number of OFDM symbols (e.g., 0, 3, 6, and 9 OFDM symbols) of the ending partial subframe of the channel occupancy period of the LAA cell using a 2-bit signal. In method 3, the LAA terminal determines the length (or number of OFDM symbols) of the ending partial subframe based on the first signal transmission start time point of the LAA cell. In this embodiment, it is assumed that the first transmission start point of the first signal of the LAA cell that occupies newly the channel for data transmission is confined to the first OFDM symbol of the first and second slots and the second signal is transmitted for 2 OFDM symbols right before the first signal transmission. Accordingly, if it is determined that the first signal transmission starts at the first slot of subframe n based on the second signal reception and decoding result, the LAA terminal may determine that the first and second signals are transmitted at the next first signal transmission occasion configured as shown in part (a) of FIG. 5 because the LAA cell cannot transmit the first signal, i.e., cannot occupy the unlicensed band to transmit a signal as shown in part (b) of FIG. 5, at least at OFDM symbol index 0 of the second slot of the second slot of subframe n−1. That is, the LAA terminal may analogize the channel occupancy start time point of the LAA base station based on the partial subframe 630 identified as a result of receiving and decoding the second signal and predict the length of the ending partial subframe 640 of the LAA base station based on the analogized information. That is, method 3 is characterized by determining the length (or number of OFDM symbols) of the ending partial subframe of the LAA cell under the assumption that the LAA cell has occupied the unlicensed band from the first signal transmission occasion preceding the first signal transmission occasion determined as the real first signal transmission start time point among the preconfigured first signal transmission occasions of the LAA cell. If it is determined that the LAA cell has transmitted the first signal at OFDM symbol index 0 of the first slot of subframe n, the terminal may analogize the length of the ending partial subframe capable of being occupied by the LAA cell under the assumption that the LAA cell has started transmitting the third signal at OFDM symbol index 0 of the second slot of subframe n−1 or OFDM symbol index 5 of the first slot in consideration of the configured second signal transmission period. Here, the LAA cell may assume that the LAA terminal uses method 3 to determine the length of the ending partial subframe and transmit the first signal in the ending partial subframe of which length is determined using method 3. In the embodiment of FIG. 6, the LAA cell may communicate with the LAA terminal in the unlicensed band in such a way of transmitting the first signal using up to 10 OFDM symbols or a number of OFDM symbols equal to the length of the first slot in the ending partial subframe or a special subframe configuration with a downlink pilot time slot (DwPTS) having a maximum number of transmission OFDM symbols available for use in transmission that is equal to or longer than the length of the ending partial subframe in the TDD configurations specified in the legacy LTE standards, the first signal including a control signal (e.g., CRS, DMRS, and CSI-RS) or control channel (e.g., PCFICH, PHICH, PDCCH, and EPDCCH) and data channels (e.g., PDSCH).

TABLE 1

[OFDM symbol configuration in TDD special subframe]
Number of OFDM symbols (normal CP)

| Config. | DwPTS | GP | UpPTS |
|---|---|---|---|
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |
| 9 | 6 | 6 | 2 |

In method 4, the LAA cell notifies the LAA terminal of the length (or number of OFDM symbols) of the ending partial subframe implicitly with the type or position of the second signal. For example, the LAA cell may notify the terminal of the length of the ending partial subframe by transmitting a mapping between a root sequence for a plurality of second signals and length (number of OFDM symbols) of ending partial subframe that is agreed with the LAA terminal or a mapping between an RB position for transmitting the second signal and the length (or the number) of OFDM symbols of the ending partial subframe.

Embodiment 2

In embodiment 2, the transmission start time point of a first or second signal is confined to an OFDM symbol conveying CRS in a partial subframe of an LAA cell. Assuming CRS port 0 and 1, it may be possible to designate the OFDM symbol indexes 0 and 4 of the first and second slots of a partial subframe of the LAA cell as the transmission occasions of the first or second signal. Assuming CRS ports 0, 1, 2, and 3, it may be possible to designate OFDM symbol indexes 0, 1, and 4 of the first and second slots of a partial subframe of the LAA cell as the transmission occasions of the first or second signal. Even when assuming CRS ports 0, 1, 2, and 3, it may be possible to designate OFDM symbol indexes 0 and 4 of the first and second slots as the transmission occasions of the first or second signal.

Although a description is made with respect to the first signal transmission occasion (e.g., PDCCH) for convenience of explanation in this embodiment, it may also be possible to designate an OFDM symbol conveying CRS as the first signal transmission occasion (e.g., PDSCH) or a second signal tansmission occasion. In this embodiment, the description is directed to the case where OFDM symbols with CRS ports 0 and 1, i.e., OFDM symbol indexes 0 and 4, of the first and second slots of a partial subframe of the LAA cell as the transmission occasions of the first or second signal in both the cases of assuming CRS ports 0 and 1 or CRS ports 0, 1, 2, and 3.

That is, it may be possible to start transmitting the first or second signal at the first or fifth OFDM symbol of the first or second slot. The description made in this embodiment may be applicable to the case of designating OFDM symbol indexes 0, 1, and 4 of the first and second slots of a partial subframe of the LAA cell as the transmission occasions of the first or second signals under the assumption of CRS ports 0, 1, 2, and 3.

In the case of designating OFDM symbols with CRS ports 0 and 1 as the transmission occasions of the first signal, if the first signal transmission starts at the first OFDM symbol of the first slot, the corresponding subframe may be regarded as a normal subframe rather than a partial subframe. This is because the first signal can be transmitted during a period of 1 ms, which is equal to the length of a normal subframe. That is, a subframe can be called a partial subframe when the first signal is mapped to the fifth OFDM symbol of the first slot, when the first signal is mapped to the first OFDM symbol of the second slot, and when the first signal is mapped to the fifth OFDM symbol of the second slot. Accordingly, in the case where the OFDM symbols with the CRS ports 0 and 1 are designated as the transmission occasions of the second signal, if the second signal is mapped to the first OFDM symbol of the first slot, the corresponding subframe may be regard as a partial subframe. That is, the partial subframe means a subframe conveying the first signal shorter than 1 ms.

Figure 7:
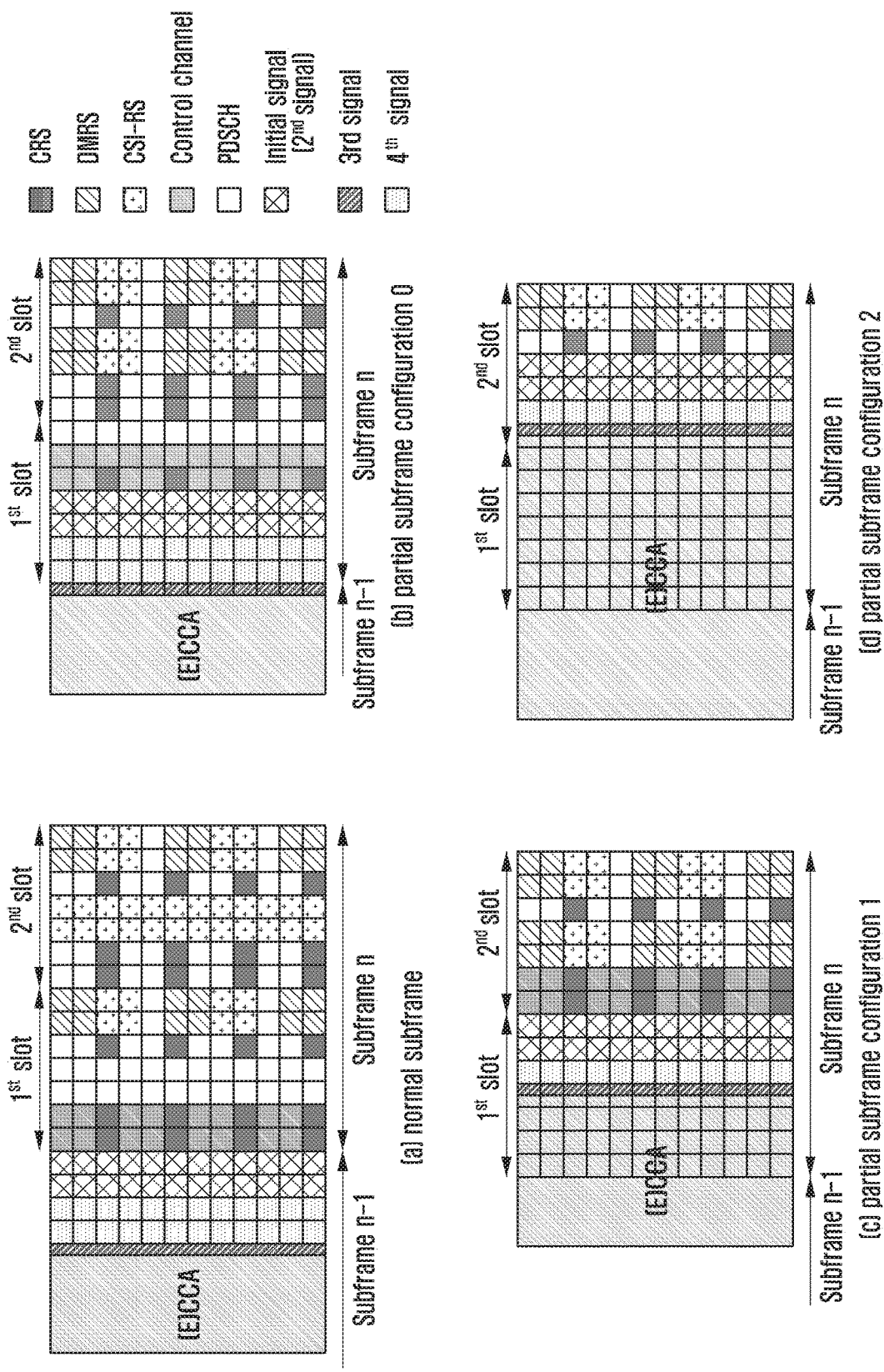
FIG. 7 is a diagram for explaining a method for using a CRS symbol-based partial subframe utilization method.

A description is made hereinafter of embodiment 2 with reference to FIG. 7. FIG. 7 is a diagram illustrating subframe configurations for mapping the first signal to the OFDM symbols with CRS ports 0 and 1 on an unlicensed frequency band channel based on an ECCA result in an LAA cell, i.e., the first OFDM symbol of the first slot (part (a) of FIG. 7), the fifth OFDM symbol of the first slot (part (b) of FIG. 7), the first OFDM symbol of the second slot (part (c) of FIG. 7), and the fifth OFDM symbol of the second slot (part (d) of FIG. 7).

In part (a) of FIG. 7, it is assumed that an LAA cell performs ECCA before subframe n and determines that the unlicensed band is idle in the fifth OFDM symbol of the second slot of subframe n-1. If the channel sensing operation is completed before the end time of an OFDM symbol of the LAA cell (e.g., if the channel sensing operation ends or if it is determined that the channel is idle before the end of the fifth OFDM symbol of the second slot), the LAA cell may transmit the third signal in the duration starting from the channel sensing operation end time point and ending right before the next OFDM symbol (e.g., from the channel sensing operation end time point and ending right before the sixth symbol of the second slot) to occupy the unlicensed band. Here, the third signal is shorter in time than one OFDM symbol of the LAA cell and may be generated and transmitted by the LAA cell with no need of complying with any standard. In this case, the LAA terminal may not receive the third signal or, although receiving the third signal, may not use the received third signal.

In this embodiment, because the transmission start time point of the first or second signal is confined to the OFDM symbols with CRS ports 0 and 1 to reduce decoding complexity of the first or second signal at the LAA terminal, the LAA cell may transmit at least one of the second to fourth signals in the duration starting from the OFDM symbol of subframe n-1 at which the channel sensing operation has been completed and ending right before the OFDM symbol with the CRS ports 0 and 1 of subframe n-1 or n to occupy the unlicensed band.

Here, the fourth signal may include a reference signal (such as CRS, DMRS, and CSI-RS), a synchronization signal (such as PSS and SSS), and a channel (such as PDCCH and PDSCH). If it is necessary to transmit the second signal before initial transmission of the first signal in the LAA cell to occupy the channel for data transmission, the second signal may be transmitted during a period predetermined for second signal transmission before the OFDM symbol with CRS ports 0 and 1.

In the case of part (a) of FIG. 7, the second signal may be transmitted during a predefined or preconfigured number of symbols including at least the ending symbol of subframe n-1 because the first signal transmission starts at the first OFDM symbol of the first slot of subframe n. That is, if it is predetermined to transmit the second signal during at least K OFDM symbols, the OFDM symbols for transmitting the second signal become OFDM symbol indexes 4-K and 7-K of the first and second slots in the case of using the normal CP.

The same method can be applied to the case of using the extended CP to determine the OFDM symbol for transmitting the second signal. In this embodiment, it is assumed that the second signal is transmitted in the period of 2 OFDM symbols, which should be followed by initial transmission of the first signal in the LAA cell, to occupy the channel for data transmission, for convenience of explanation. Accordingly, the OFDM symbol indexes 2 and 5 of the first and second slots are designated as second signal transmission occasions. That is, the second signal may be transmitted in the period of two OFDM symbols including the third or fifth OFDM symbol of the first or second slot.

Here, the second signal may be transmitted repetitively in the period of two OFDM symbols, the second signals in the two respective OFDM symbols being identical with or different from each other. It may also be possible to skip transmitting the second signal or transmit the second signal in one OFDM symbol or 3 or more OFDM symbols. The second signal transmission occasions may be predefined or configured by the LAA cell using a higher layer signal. Accordingly, the second signal transmission occasions may be implicitly designated when the OFDM symbols with CRS ports 0 and 1 are designated as the first signal transmission occasions under the assumption that the second signal is transmitted in the period of two OFDM symbols, which should be followed by initial transmission of the first signal in the LAA cell, to occupy the channel for data transmission.

That is, OFDM symbol indexes 0 and 4 of the first and second slots are designated as the first signal transmission occasions, and OFDM symbol indexes 2 and 5 of the first and second slots are designated as the second signal transmission occasions. Accordingly, if OFDM symbol indexes 0 and 4 of the first and second slots are designated as the first signal transmission occasions under the assumption that the second signal is transmitted in the period of 2 OFDM symbols, which should be followed by initial transmission of the first signal in the LAA cell, to occupy the channel for data transmission, the LAA cell that has detected that the unlicensed band is idle before a second signal transmission occasion may repeat transmission of the third signal, transmit a newly defined fourth signal, or repeat transmission of the second signal before the second signal transmission occasion to maintain occupancy of the unlicensed band.

In the case of repeating transmission of the second signal, the LAA terminal may ignore the second signal or, although receiving the second signal, may not use the received second signal. That is, the second signal configured for use by the LAA terminal is transmitted in the period of 2 OFDM symbols followed by transmitting the first signal. As described in this embodiment, if OFDM symbol indexes 0 and 4 of the first and second slots are designated as the first signal transmission occasions under the assumption that the second signal is transmitted in the period of 2 OFDM symbols, which should be followed by initial transmission of the first signal in the LAA cell, to occupy the channel for data transmission, the LAA cell may start transmitting an arbitrary signal or a signal agreed with terminal in a period starting from the time point when the unlicensed band is sensed as idle until before the next second signal transmission occasion to maintain occupancy of the unlicensed band and may start transmitting the first signal including a control signal (e.g., CRS, DMRS, and CSI-RS) or control channel (e.g., PCFICH, PHICH, PDCCH, and EPDCCH) and data (e.g., PDCCH) at the first signal transmission occasion to communicate with the LAA terminal in the unlicensed band.

Meanwhile, the LAA terminal may receive and decode the second signal at the second signal transmission occasion predefined or configured through higher layer signaling and perform an operation that should be executed upon receipt of the second signal (e.g., AGC adjustment, time or frequency synchronization, or transmitting device ID check). Afterward, the LAA terminal may start receiving the first signal including the control signal (e.g., CRS, DMRS, and CSI-RS) or control channel (PCFICH, PHICH, PDCCH, and EPD- CCH) and data channel (e.g., PDSCH) at the first signal transmission occasion to communicate with the LAA cell in the unlicensed band.

If it is not necessary for the LAA terminal to perform the second signal reception and decoding operation, the LAA terminal may receive the first signal at the first signal transmission occasion predefined or configured through higher layer signaling to communicate with the LAA cell.

Part (b) of FIG. 7 is directed to a case where the first signal is transmitted at the fifth OFDM symbol, i.e., OFDM symbol 4, of the first slot. In detail, the LAA cell detects that the unlicensed band is in the idle state at the last OFDM symbol of subframe n−1.

In this embodiment, the LAA cell may transmit at least one of the second to fourth signals before OFDM symbol index 0 of the first slot of subframe n to maintain occupancy of the unlicensed band because the first signal transmission occasion of the LAA cell is confined to the OFDM symbols with CRS ports 0 and 1. If it is assumed that the second signal is transmitted in the period of 2 OFDM symbols, should be followed by initial transmission of the first signal in the LAA cell, to occupy the channel for data transmission as described with reference to part (a) of FIG. 7, the LAA cell may transmit at least one of the second to fourth signals until the second signal transmission occasion (i.e., OFDM symbol index 2 of the first slot) to maintain occupancy of the unlicensed band and starts transmitting the first signal including a control signal (e.g., CRS, DMRS, and CI-RS) or control channel (e.g., PCFICH, PHICH, PDCCH, and EPD-CCH) and data channels (e.g., PDSCH) at the first and second signal transmission occasions to communicate with the LAA terminal in the unlicensed band. In the cases of parts (c) and (d) of FIG. 7, the configurations of parts (a) and (b) of FIG. 6 are applicable in the same manner.

Although the embodiment of part (a) of FIG. 7 can be implemented by reusing the DMRS signal and positions as specified in the legacy LTE standard, it is difficult to implement the embodiment of parts (b) and (c) of FIG. 7 as such because such DMRS positions are not specified in the legacy LTE standard. Accordingly, it is necessary to define new DMRS positions for the case where the OFDM symbols with CRS ports 0 and 1 are designated as the transmission occasions for initial transmission of the first signal in the LAA cell occupying the unlicensed band initially for data transmission. In this case, if the first signal transmission starts at the first OFDM symbol of the first slot (i.e., part (a) of FIG. 7), it may be possible to reuse the DMRS configuration specified in the legacy LTE standard.

If DMRS is transmitted at $3^{rd}$, $4^{th}$, $6^{th}$, and $7^{th}$ OFDM symbols (OFDM symbol index I=2, 3, 5, 6) of the second slot as shown in parts (b) and (c) of FIG. 7 and at the $6^{th}$ and $7^{th}$ OFDM symbols (OFDM symbol index I=5, 6) of the second slot as shown in part (d) of FIG. 7, the new DMRS symbol position l may be designated as follows. In this case, the frequency position k of the DMRS mapped to at least one of the $3^{rd}$, $4^{th}$, $6^{th}$, and $7^{th}$ OFDM symbols of the second slot may be configured as specified in the legacy LTE standard.

$$w_p(i) = \begin{cases} \overline{w}_p(i) & (m' + n_{PRB})\mathrm{mod}2 = 0 \\ \overline{w}_p(3-i) & (m' + n_{PRB})\mathrm{mod}2 = 1 \end{cases} \quad \text{[Formula 1]}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\mathrm{mod}2 + 2 + 3\lfloor l'/2 \rfloor & \text{if in a partial subframe with configuration 0, 1, 2} \\ l'\mathrm{mod}2 + 5 & \text{if not in a partial subframe} \end{cases}$$

$$l' = \begin{cases} 0, 1, 2, 3 & \text{if } n_s\mathrm{mod}2 = 1 \text{ and in a partial subframe with configuration 0, 1} \\ 2, 3 & \text{if } n_s\mathrm{mod}2 = 1 \text{ and in a partial subframe with configuration 2} \\ 0, 1 & \text{if } n_s\mathrm{mod}2 = 0 \text{ and not in a partial subframe} \\ 2, 3 & \text{if } n_s\mathrm{mod}2 = 1 \text{ and not in a partial subframe} \end{cases}$$

$$m' = 0, 1, 2$$

If DMRS is transmitted at the third and fourth OFDM symbols (OFDM symbol index l=2, 3) of the second slog in parts (b) and (c) of FIG. 7, the new DMRS symbol position l for the case of transmitting DMRS at the $6^{th}$ and $7^{th}$ OFDM symbols (OFDM symbol index l=5, 6) of the second slot may be designated as follows. Here, the frequency position k of DMRS in the case where DMRS is transmitted at least one of the $3^{rd}$, $4^{th}$, $6^{th}$, and $7^{th}$ OFDM symbols of the second slot may be designated as specified in the legacy LTE standard.

$$w_p(i) = \begin{cases} \overline{w}_p(i) & (m' + n_{PRB})\mathrm{mod}2 = 0 \\ \overline{w}_p(3-i) & (m' + n_{PRB})\mathrm{mod}2 = 1 \end{cases} \quad \text{[Formula 2]}$$

$$k = 5m' + N_{sc}^{RB} n_{PRB} + k'$$

-continued $$k' = \begin{cases} 1 & p \in \{7, 8, 11, 13\} \\ 0 & p \in \{9, 10, 12, 14\} \end{cases}$$

$$l = \begin{cases} l'\bmod 2 + 2 + 3\lfloor l'/2 \rfloor & \text{if in a partial subframe with configuration 0, 1, 2} \\ l'\bmod 2 + 5 & \text{if not in a partial subframe} \end{cases}$$

$$l' = \begin{cases} 0, 1 & \text{if } n_s\bmod 2 = 1 \text{ and in a partial subframe with configuration 0, 1} \\ 2, 3 & \text{if } n_s\bmod 2 = 1 \text{ and in a partial subframe with configuration 2} \\ 0, 1 & \text{if } n_s\bmod 2 = 0 \text{ and not in a partial subframe} \\ 2, 3 & \text{if } n_s\bmod 2 = 1 \text{ and not in a partial subframe} \end{cases}$$

$$m' = 0, 1, 2$$

The new DMRS symbol position l for the case of transmitting DMRS at the $6^{th}$ and $7^{th}$ OFDM symbols (OFDM symbol index l=5, 6) of the second slot as show in parts (b), (c), and (d) of FIG. 7 may be designated as follows. At this time, the DMRS frequency position (k) for the case of transmitting DMRS at at least one of the $6^{th}$ and $7^{th}$ OFDM symbols of the second slot may be designated as specified in the legacy LTE standard.

[Formula 3]

$$w_p(i) = \begin{cases} \bar{w}_p(i) & (m' + n_{PRB})\bmod 2 = 0 \\ \bar{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 + 3\lfloor l'/2 \rfloor & \text{if in a partial subframe with configuration 0, 1, 2} \\ l'\bmod 2 + 5 & \text{if not in a partial subframe} \end{cases}$$

$$l' = \begin{cases} 2, 3 & \text{if } n_s\bmod 2 = 1 \text{ and in a partial subframe with configuration 0, 1, 2} \\ 0, 1 & \text{if } n_s\bmod 2 = 0 \text{ and not in a partial subframe} \\ 2, 3 & \text{if } n_s\bmod 2 = 1 \text{ and not in a partial subframe} \end{cases}$$

$$m' = 0, 1, 2$$

It may be possible to preconfigure such that the LAA cell does not transmit DMRS in the partial subframes as shown in parts (b), (c), and (d) of FIG. 7. If no DMRS is transmitted in the partial subframe, the LAA cell may not schedule the LAA terminal configured to perform a PDSCH reception operation based on DMRS as in TM10 or may configure the LAA terminal to perform a PDSCH reception operation based on CRS using DCI format 1A.

In this case, the LAA terminal may detect the partial subframe upon receipt of the second signal without extra signaling from the LAA cell and assume the absence of DMRS in the corresponding subframe. It may also be possible for the LAA terminal to detect the partial subframe based on the receipt of CRS conveyed in the first signal and assume the absence of DMRS in the corresponding subframe.

That is, the LAA terminal may regard the subframe conveying the second signal as a partial subframe and thus assume no DMRS transmission or perform a CRS-based PDSCH reception operation rather than a DMRS-based PDSCH reception operation. That is, if the second signal and DMRS are conveyed in the same subframe, it may be possible to determine that DMRS has not been transmitted. Even when the LAA cell configures the terminal to perform a DMRS-based PDSCH reception operation in the partial subframe, the terminal may handle PDSCH as NACK or a perform CRS-based PDSCH reception operation.

In the partial subframe as shown in parts (b), (c), and (d) of FIG. 7, it may be possible to preconfigure the LAA cell not to transmit CSI-RS. That is, in the case that the CSI-RS resources for the LAA cell are assigned periodically according to the time of the licensed band PCell or the unlicensed band LAA cell, if the subframe conveys only the CSI-RS or both the second signal and CSI-RS, the LAA terminal may determine the corresponding subframe as a partial subframe and thus assume absence of CSI-RS of the LAA cell or skip a CSI-RS-based reception and a channel estimation operation in the partial subframe.

In the case of configuring the LAA cell not to transmit CSI-RS, the LAA terminal may assume that the partial subframe conveying no CSI-RS and may perform the PDSCH reception operation without extra rate matching on configured or part of the NZP-CSI-RS or all ZP-CSI-RS resources. The LAA cell may transmit CSI-RS on part of the CSI-RS resources even in a partial subframe depending on the configuration of the partial subframe (e.g., CRS and DMRS). For example, the CSI-RS resource region of the partial subframe as marked in parts (b), (c), and (d) of FIG. 7 can be used for transmitting CSI-RS. Accordingly, in the case that the CSI-RS resources for the LAA cell are assigned periodically according to the time of the licensed band PCell or the unlicensed band LAA cell, if the subframe conveys only the CSI-RS or both the second signal and CSI-RS, the LAA terminal may determine the corresponding subframe as a partial subframe and perform CSI-RS reception on the available CSI-RS resources for channel estimation and rate matching on CSI-RS resources to receive PDSCH depending on the configuration of the partial subframe (e.g., DMRS position).

In the case of initial transmission of the first signal in the LAA cell to occupy the channel for data transmission using a partial subframe, the subframe conveying the first signal transmitted last in the predefined or preconfigured unlicensed band channel occupancy time 670 may also be a partial subframe. A description thereof is made with reference to FIG. 6. It is assumed that the LAA cell that communicates with the LAA terminal in the unlicensed band performs a channel sensing operation as denoted by reference number 600 and determines that the unlicensed band is in the idle state.

The LAA cell may transmit a third signal 610 according to the time point when it is determined as the channel sensing result as denoted by reference number 600 that the channel is idle. In the case where the first signal transmission occasion is confined to the first OFDM symbols with CRS port 0, 1 of the first and second slots under the assumption that the second signal 620 is transmitted in the period of 2 OFDM symbols, which should be followed by initial transmission of the first signal 650 and 660 in the LAA cell, to occupy the channel for data transmission, the LAA cell may transmit a fourth signal 615 (e.g., at least one of the second and third signals, an arbitrary signal, and a signal pre-agreed with the terminal) to maintain occupancy of the unlicensed band, the fourth signal transmission being possible upon sensing the idle state of the unlicensed band before a second signal transmission occasion, and the first signal including a control signal (e.g., CRS, DMRS, and CSI-RS) or control channel (e.g., PCFICH, PHICH, PDCCH, and EPDCCH) and data channel (e.g., PDCCH) at the first signal transmission occasion to communicate with the LAA terminal in the unlicensed band.

At this time, the LAA cell may occupy the unlicensed band during the predefined or preconfigured unlicensed band channel occupancy time 670 including the transmission time point of the third signal 610. Accordingly, at least one partial subframe 630 and 640 may exist during the unlicensed band channel occupancy time 670. In order to make the best use of the unlicensed band channel occupancy time 670, it may be necessary to use the partial subframes 630 and 640.

If the first signal transmission occasion is confined to the first OFDM symbols with CRS port 0, 1 of the first and second slots under the assumption that the second signal is transmitted in the period of 2 OFDM symbols, which should be followed by initial transmission of the first signal in the LAA cell, to occupy channel for data transmission as in this embodiment, the terminal may attempt receiving and decoding of the second signal or the CRS included in the first signal at the second signal position configured as above so as to determine whether the unlicensed band of the LAA cell is occupied.

However, because the LAA cell may transmit the third and fourth signals 610 and 615 according to the channel sensing operation end time point of the LAA cell, a terminal without a capability of receiving and decoding the third and fourth signals 610 and 615 cannot determine correctly the real channel occupancy start time point of the LAA cell.

In the case where the LAA terminal which cannot determine correctly the real channel occupancy start time point, if the last subframe of the channel occupancy period 670 of the LAA cell is a partial subframe 640, the LAA terminal cannot predict the length of the partial subframe. For example, assuming that the channel occupancy period 670 of the LAA cell is 4 ms in FIG. 6, if the first subframe of the channel occupancy period 670 of the LAA cell is a partial subframe 630 and has a length of up to 4 OFDM symbols, the final subframe of the channel occupancy period 670 of the LAA cell is a partial subframe having up to 10 OFDM symbols.

However, if the terminal without the capability of receiving and decoding the third and fourth signals 610 and 615 determines the length of the starting partial subframe of the channel occupancy duration 670 of the LAA cell based on the second signal reception and decoding time point as denoted by reference number 630, it cannot correctly determine the length of the ending partial subframe. This embodiment proposes a method for a terminal without the capability of receiving and decoding the third and fourth signals 610 and 615 as above to determine the length of the ending partial subframe of the channel occupancy period of the LAA cell.

Method 1: Determine the length (or number of OFDM symbols) of the ending partial subframe of the channel occupancy period of an LAA cell as 0

Method 2: Receive information on the length (or number of OFDM symbols) of the ending partial subframe of the channel occupancy period of an LAA cell through a downlink control channel of the LAA cell or PCell Method 3: Determine the length (or number of OFDM symbols) of the ending partial subframe of the channel occupancy period of an LAA cell based on the first signal transmission occasion of the LAA cell Method 4: Determine the length (or number of OFDM symbols) of the ending partial subframe based on type and position of the second signal In the first method, the LAA terminal determines that the length (or number of OFDM symbols) of the ending partial subframe of the channel occupancy period of the LAA cell as 0, i.e., it may be preconfigured not to use the ending partial subframe of the channel occupancy period of the LAA cell.

That is, if the LAA cell that has occupied the unlicensed band determines that the last subframe of the channel occupancy period 670 is a partial subframe, it may not transmit the first signal in the partial subframe. In method 2, the LAA terminal receives the information on the length (or number of OFDM symbols) of the ending partial subframe of the channel occupancy period of the LAA cell through a downlink control channel of the LAA cell or PCell. Here, in order to reduce downlink control channel overhead, it may be possible to limit the length (or number of OFDM symbols) of the ending partial subframe of the channel occupancy period of the LAA cell.

For example, it may be possible to notify the LAA terminal of the number of OFDM symbols (e.g., 0, 3, 6, and 9 OFDM symbols) of the ending partial subframe of the channel occupancy period of the LAA cell using a 2-bit signal. In method 3, the LAA terminal determines the length (or number of OFDM symbols) of the ending partial subframe based on the first signal transmission start time point of the LAA cell. In this embodiment, it is assumed that the first transmission start point of the first signal of the LAA cell that occupies newly the channel for data transmission is confined to the first OFDM symbol with CRS port 0, 1 of the first and second slots and the second signal is transmitted from 2 OFDM symbols immediately before the first signal transmission.

Accordingly, if it is determined that the first signal transmission starts at the first slot of subframe n based on the second signal reception and decoding result, the LAA terminal may determine that the first and second signals are transmitted at the next first signal transmission occasion configured as shown in part (a) of FIG. 7 because the LAA cell cannot transmit the first signal, i.e., cannot occupy the unlicensed band to transmit a signal as shown in part (d) of FIG. 7, at least at OFDM symbol 4 of the second slot of the second slot of subframe n−1. That is, the LAA terminal may analogize the channel occupancy start time point of the LAA base station based on the partial subframe 630 identified as a result of receiving and decoding the second signal and predict the length of the ending partial subframe 640 of the LAA base station based on the analogized information.

That is, method 3 is characterized by determining the length (or number of OFDM symbols) of the ending partial subframe of the LAA cell under the assumption that the LAA cell has occupied the unlicensed band from the first signal transmission occasion preceding the first signal transmission occasion determined as the real first signal transmission start time point among the preconfigured first signal transmission occasions of the LAA cell. If it is determined that the LAA cell has transmitted the first signal at OFDM symbol index 0 of the first slot of subframe n, the terminal may analogize the length of the ending partial subframe capable of being occupied by the LAA cell under the assumption that the LAA cell starts transmitting the third signal at OFDM symbol index 4 of the second slot of subframe n−1 or OFDM symbol index 2 of the second slot in consideration of the configured second signal transmission period.

Here, the LAA cell may assume that the LAA terminal uses method 3 to determine the length of the ending partial subframe and transmit the first signal in the ending partial subframe of which the length is determined using method 3. In the embodiment of FIG. 6, the LAA cell may communicate with the LAA terminal in the unlicensed band in such a way of transmitting the first signal using up to 10 OFDM symbols or a number of OFDM symbols equal to the length of the first slot in the ending partial subframe or a special subframe configuration with a downlink pilot time slot (DwPTS) (see tables 3, 6, 9, 10, 11, and 12) having a maximum number of transmission OFDM symbols available for use in transmission that is equal to or longer than the length of the ending partial subframe in the TDD configurations specified in the legacy LTE standards, the first signal including a control signal (e.g., CRS, DMRS, and CSI-RS) or control channel (e.g., PCFICH, PHICH, PDCCH, and EPDCCH) and data channels (e.g., PDSCH).

TABLE 2

[OFDM symbol configuration in TDD special subframe]
Number of OFDM symbols (normal CP)

| Config. | DwPTS | GP | UpPTS |
|---|---|---|---|
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |

TABLE 2-continued

[OFDM symbol configuration in TDD special subframe]
Number of OFDM symbols (normal CP)

| Config. | DwPTS | GP | UpPTS |
|---|---|---|---|
| 5 | 3 | 9 | 2 |
| 6 | 9 | 3 | 2 |
| 7 | 10 | 2 | 2 |
| 8 | 11 | 1 | 2 |
| 9 | 6 | 6 | 2 |

In method 4, the LAA cell notifies the LAA terminal of the length (or number of OFDM symbols) of the ending partial subframe implicitly with the type or position of the second signal. For example, the LAA cell may notify the terminal of the length of the ending partial subframe by transmitting a mapping between a root sequence for a plurality of second signals and length (number of OFDM symbols) of ending partial subframe that are agreed with the LAA terminal or a mapping between an RB position for transmitting the second signal and the length (or the number of OFDM symbols) of the ending partial subframe.

Figure 8:
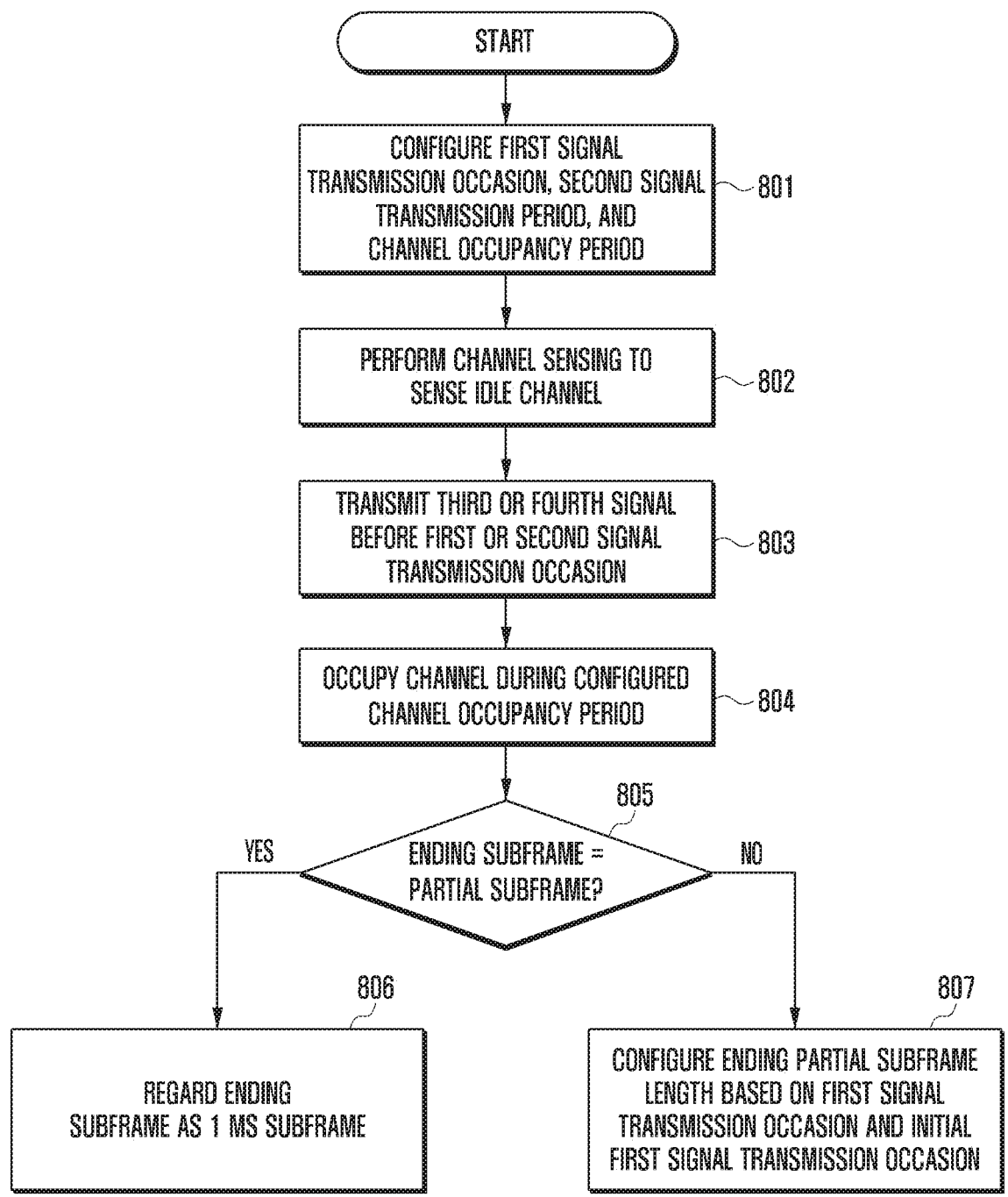
FIG. 8 is a flowchart illustrating an operation of a base station according to an embodiment of the present invention.

FIG. 8 is a flowchart illustrating an operation of a base station according to an embodiment of the present invention. The base station may configure or predefine at least one of an unlicensed band channel occupancy period, a first signal transmission occasion, and a second signal transmission period at step 801. For example, the channel occupancy period may be preconfigured in compliance with the standard.

If there is no need of the second signal, it may be possible to skip configuring the second signal transmission occasion. At step 801, the base station may configure an ending partial subframe determination scheme at an LAA terminal. The LAA cell operating in the unlicensed band may perform a channel sensing operation in the unlicensed band at step 802. If the unlicensed band is sensed as idle at step 802, the LAA cell may transmit at least one of the third and fourth signal in a period starting from the idle channel sensing time point until before the first or second signal transmission occasion. It may also be possible to transmit the second signal in addition to the third or fourth signal.

After transmitting the third or fourth signal, the LAA cell may start transmitting the first or second signal at the first or second signal transmission occasion and occupy the channel during the channel occupancy period including the duration of transmitting the third or fourth signal. If it is determined at step 805 that the last subframe is a partial subframe, the LAA cell may configure the ending partial subframe length at step 807 based on the first signal transmission occasion, initial first signal transmission occasion, and ending partial subframe determination scheme. If it is determined that the last subframe is a normal subframe spanning 1 ms, the last subframe may be handled in the legacy manner.

Figure 9:
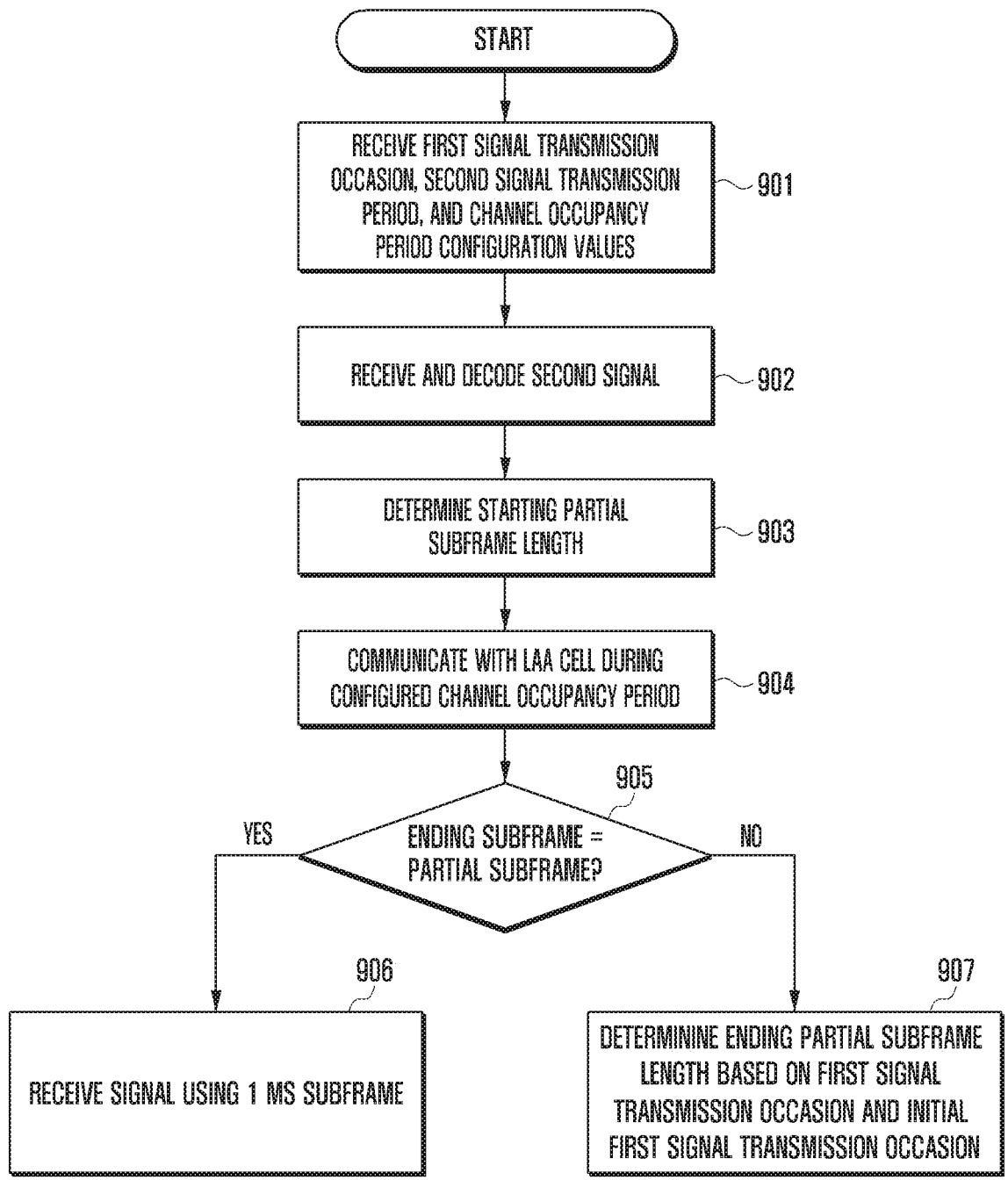
FIG. 9 is a flowchart illustrating an operation of a terminal according to an embodiment of the present invention.

FIG. 9 is a flowchart illustrating an operation of a terminal according to an embodiment of the present invention. The terminal may receive or be preconfigured with at least one of configuration values of an unlicensed band channel occupancy period, a first signal transmission occasion, and a second signal transmission period at step 901. For example, the channel occupancy period may be preconfigured in compliance with the standard. If there is no need of the second signal, the second signal transmission occasion may not be configured.

At step 901, an ending partial subframe determination scheme of the LAA terminal may be configured or predefined. The terminal may receive and decode the first or second signal transmitted by an LAA cell at step 902 to detect channel occupancy of the LAA cell and determine at step 903 a starting partial subframe length including the initial channel transmission occasion of the LAA cell.

The LAA terminal may communicate with the LAA cell during the channel occupancy period at step 904. If it is determined at step 905 that the last subframe is a partial subframe, the LAA terminal may determine the ending partial subframe length at step 907 based on the first signal transmission occasion, initial first signal transmission occasion, and ending partial subframe determination scheme. The ending partial subframe length may be predetermined at step 902 or 903. If it is determined that the last subframe is a normal subframe spanning 10 ms, the last subframe may be handled in the legacy manner.

Figure 10:
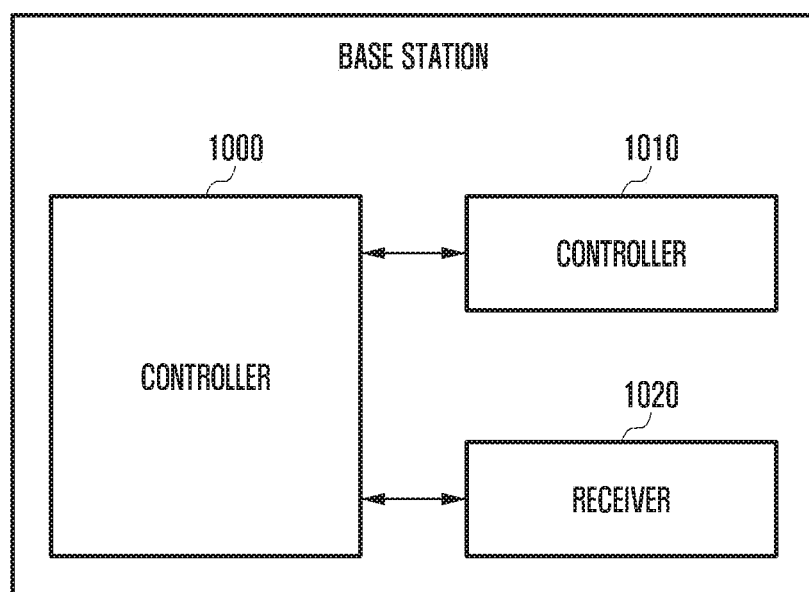
FIG. 10 is a block diagram illustrating a base station operating in an unlicensed band according to an embodiment of the present invention.

FIG. 10 is a block diagram illustrating a base station operating in an unlicensed band according to an embodiment of the present invention.

The base station includes a receiver 1010, which may receive signals from other base stations and terminals and perform measurement on the channels from the other base stations and terminals and channel sensing in the unlicensed band channel using channel sensing operation-related configuration values configured by a controller 1000 of the base station.

The controller 1000 may determine whether the unlicensed band is in the idle state based on the unlicensed band information collected by the receiver 1020. If it is determined that the unlicensed band is in the idle state, the controller 1000 may transmit a signal for channel occupancy or control channel or data channel information to a terminal by means of a transmitter 1010.

If it is determined that the unlicensed band is not in the idle state, the controller 1000 may configure the receiver 1020 to continue the channel sensing operation. The controller 1000 may determine part or all of configuration of parameters for transmitting control channels (such as PDCCH and EPDCCH) and various types of reference signals per terminal, parameters for configuration and communication between the base station and terminal for PDSCH/EPDCCH scheduling, and channel sensing operation parameters such as the contention period.

The controller 1000 may configure the signal length of at least one of the first to fourth signals differently according to a channel sensing operation end time point or the length of the channel occupancy period and may configure the first and second signal transmission occasions and the ending partial subframe determination scheme. The controller 1000 may notify the terminal of the parameters for use between the base station and the terminal by means of the transmitter 1010.

Figure 11:
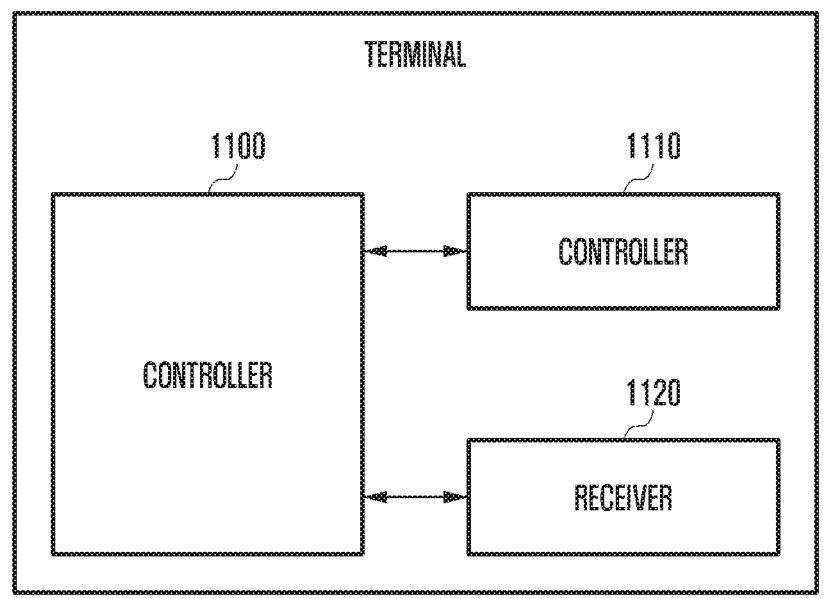
FIG. 11 is a block diagram illustrating a configuration of a terminal operating in an unlicensed band according to an embodiment of the present invention.

FIG. 11 is a block diagram illustrating a configuration of a terminal operating in an unlicensed band according to an embodiment of the present invention.

In FIG. 11, the terminal includes a controller 1100, which controls a receiver 1120 to receive configuration information for use in communicating signals with a base station in the licensed and unlicensed bands from the base station and to use the unlicensed band based on the received configuration information.

The controller 1100 may control the receiver 1120 to receive the information on the first and second signal transmission occasions and configuration, LAA cell's channel occupancy period configuration, and ending partial subframe determination schemes.

The controller 1100 may control the receiver 1120 to acquire status information of the unlicensed band based on at least one of a configuration value for determining whether scheduling is available in the subframe for the channel sensing operation configured by the base station, a configuration value for the signal being transmitted at a symbol from which the channel occupancy of the base station starts, and status information of the unlicensed band for transmission from the base station to the terminal through the licensed band or unlicensed band.

The controller may determine whether the LAA cell has occupied the channel based on the second signal transmitted by the LAA cell. The controller 1100 may also determine the ending partial subframe length of the LAA cell based on at least one of the first and second signal transmission occasions and channel occupancy period that are configured by the LAA cell.

The controller 1100 may also check the reception result of the data signal transmitted by the base station and notify the base station of the data signal reception result by means of the transmitter 1110. The receiver 1120 may extract PDSCH/EPDSCH scheduling information from the received control information. The controller 1100 may include a decoder for decoding the PDSCH/EPDSCH received by the receiver 1120.

The invention claimed is:

1. An operation method of a base station in a mobile communication system operating in an unlicensed band, the method comprising:
    communicating with a terminal in a first cell;
    identifying a configuration for a signal transmission occasion, wherein the signal transmission occasion is associated with a starting symbol of a slot in a subframe of a second cell;
    determining resources to occupy, based on a sensing result for a band corresponding to the second cell and a time period allowed for communication with the terminal;
    identifying whether a last subframe containing the resources determined to occupy corresponds to a partial subframe;
    transmitting, to the terminal, information on a length of the partial subframe in a case that the last subframe corresponds to the partial subframe; and
    communicating with the terminal on the resources determined to occupy based on the signal transmission occasion.

2. The method of claim 1, wherein the signal transmission occasion is configured to a first slot of the subframe.

3. The method of claim 1,
    wherein the signal transmission occasion is configured to a first slot of the subframe, and a second slot of the subframe.

4. The method of claim 1, wherein the subframe comprises a first slot and a second slot, and a demodulation reference signal (DMRS) is mapped, in the second slot, to a position identical with a DMRS position in the first cell.

5. The method of claim 1, further comprising:
    determining whether the partial subframe identified based on the time period allowed for communication with the terminal is in a first subframe.

6. The method of claim 5, wherein the transmitting of the information on the length of the partial subframe comprises:
    transmitting the information on the length of the partial subframe to the terminal, in each of the first subframe and a second subframe preceding the first subframe, through a downlink control channel.

7. The method of claim 5, wherein the transmitting of the information on the length of the partial subframe comprises:
  determining whether a starting partial subframe in the time period allowed for communication with the terminal on the resources determined to occupy is a second subframe;
  checking, when the starting partial subframe is in the second subframe, a length of the starting partial subframe; and
  calculating the length of the partial subframe based on the length of the starting partial subframe.

8. A base station of a mobile communication system operating in an unlicensed band, the base station comprising:
  a transceiver; and
  a controller coupled with the transceiver and configured to control to:
    communicate with a terminal in a first cell,
    identify a configuration for a signal transmission occasion, wherein the signal transmission occasion is associated with a starting symbol of a slot in a subframe,
    determine resources to occupy, based on a sensing result for a band corresponding to a second cell and a time period allowed for communication with the terminal;
    identify whether a last subframe containing the resources determined to occupy corresponds to a partial subframe;
    transmit, to the terminal, information on a length of the partial subframe in a case that the last subframe corresponds to the partial subframe; and
    communicate with the terminal on the resources determined to occupy based on the signal transmission occasion.

9. The base station of claim 8, wherein the signal transmission occasion is configured to a first slot of the subframe.

10. The base station of claim 8, wherein the signal transmission occasion is configured to a first slot of the subframe, and a second slot of the subframe.

11. The base station of claim 8, wherein the subframe comprises a first slot and a second slot, and a demodulation reference signal (DMRS) is mapped, in the second slot, to a position identical with a DMRS position in the first cell.

12. The base station of claim 8, wherein the controller is configured to:
  determine whether the partial subframe identified based on the time period allowed for communication with the terminal is in a first subframe.

13. The base station of claim 12, wherein the controller is configured to:
  transmit the information on the length of the partial subframe to the terminal, in each of the first subframe and a second subframe preceding the first subframe, through a downlink control channel.

14. The base station of claim 12, wherein the controller is configured to:
  determine whether a starting partial subframe in the time period allowed for communication with the terminal on the resources determined to occupy is a second subframe,
  check, when the starting partial subframe is in the second subframe, a length of the starting partial subframe, and
  calculate the length of the partial subframe based on the length of the starting partial subframe.

* * * * *